(12) United States Patent
Tateishi

(10) Patent No.: US 10,745,577 B2
(45) Date of Patent: Aug. 18, 2020

(54) AQUEOUS SOLUTION, COLORING COMPOSITION, INK JET RECORDING INK, INK JET RECORDING METHOD, AND INK CARTRIDGE

(71) Applicant: FUJIFILM Corporation, Tokyo (JP)

(72) Inventor: Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/365,984

(22) Filed: Mar. 27, 2019

(65) Prior Publication Data

US 2019/0218408 A1 Jul. 18, 2019

Related U.S. Application Data

(63) Continuation of application No. PCT/JP2017/033151, filed on Sep. 13, 2017.

(30) Foreign Application Priority Data

Sep. 30, 2016 (JP) .................... 2016-193942

(51) Int. Cl.
| | |
|---|---|
| *C09D 11/328* | (2014.01) |
| *C09D 11/033* | (2014.01) |
| *C09D 11/037* | (2014.01) |
| *C09D 11/38* | (2014.01) |
| *C09B 11/24* | (2006.01) |
| *B41J 2/01* | (2006.01) |
| *B41J 2/21* | (2006.01) |
| *B41M 5/00* | (2006.01) |

(52) U.S. Cl.
CPC ........... *C09D 11/328* (2013.01); *B41J 2/2107* (2013.01); *B41M 5/0023* (2013.01); *C09B 11/24* (2013.01); *C09D 11/033* (2013.01); *C09D 11/037* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 5,514,208 A | 5/1996 | Nagai et al. | |
| 8,628,588 B2* | 1/2014 | Fujie | C09B 11/24 106/31.47 |
| 8,636,814 B2* | 1/2014 | Fujie | C09D 11/328 106/31.47 |
| 9,023,138 B2* | 5/2015 | Fujie | C09B 29/0037 106/31.43 |
| 9,023,139 B2* | 5/2015 | Fujie | C09B 11/24 106/31.43 |
| 9,701,839 B2* | 7/2017 | Fujie | C09B 11/28 |
| 9,963,605 B2* | 5/2018 | Fujie | C09D 11/328 |
| 10,487,210 B2* | 11/2019 | Yagi | B41J 3/4078 |
| 2007/0052783 A1* | 3/2007 | Taguchi | B41M 5/5227 347/100 |
| 2011/0067598 A1* | 3/2011 | Takahashi | C09B 11/20 106/31.43 |
| 2014/0285567 A1* | 9/2014 | Suenaga | B41J 2/17503 347/20 |
| 2016/0312032 A1 | 10/2016 | Fujie et al. | |
| 2017/0101534 A1* | 4/2017 | Fujie | C09D 11/328 |
| 2017/0190928 A1 | 7/2017 | Fujie et al. | |
| 2017/0210928 A1 | 7/2017 | Fujie et al. | |
| 2018/0127584 A1* | 5/2018 | Sakai | B41J 2/01 |
| 2018/0340085 A1* | 11/2018 | Tateishi | B41J 2/01 |
| 2018/0346743 A1* | 12/2018 | Tateishi | C09D 11/328 |
| 2018/0371254 A1* | 12/2018 | Tateishi | C09D 11/328 |
| 2019/0218408 A1* | 7/2019 | Tateishi | C09D 11/033 |

FOREIGN PATENT DOCUMENTS

| | | |
|---|---|---|
| EP | 3 202 857 A1 | 8/2017 |
| EP | 3 321 328 A1 | 5/2018 |
| JP | 7-179796 A | 7/1995 |
| JP | 2008-94898 A | 4/2008 |
| JP | 5451556 B2 | 3/2014 |
| JP | 2014-201714 A | 10/2014 |
| JP | 2017-179089 A | 10/2017 |
| WO | 2015/105108 A1 | 7/2015 |
| WO | 2015/147112 A1 | 10/2015 |
| WO | 2016/052685 A1 | 4/2016 |
| WO | 2016/052687 A1 | 4/2016 |
| WO | 2017/006939 A1 | 1/2017 |
| WO | 2017/146070 A1 | 8/2017 |
| WO | 2017/146233 A1 | 8/2017 |
| WO | 2017/146234 A1 | 8/2017 |
| WO | 2017/146235 A1 | 8/2017 |

OTHER PUBLICATIONS

Proxel XL2 MSDS, www3.epa.gov/pesticides/chem_search/ppls/010182-00405-19950601.pdf; Jun. 1995; 9 pages.*
Proxel XL2 Antimicrobial by Lonza, https://www.ulprospector.com/en/eu/Adhesives/Detail/6216/108942/PROXEL-XL2-Antimicrobial; no date available; 2 pages.*
International Preliminary Report on Patentability (PCT/IPEA/409) dated Dec. 26, 2018 issued by the International Searching Authority in International Application No. PCT/JP2017/033151.
International Search Report (PCT/ISA/210) dated Dec. 5, 2017 issued by the International Searching Authority in International Application No. PCT/JP2017/033151.
Communication dated Aug. 29, 2019 issued by the European Intellectual Property Office in counterpart European Application No. 17855740.1.
Office Action dated Feb. 18, 2020, issued by the Japanese Patent Office in counterpart Japanese Application No. 2018-542370.

* cited by examiner

*Primary Examiner* — Helene Klemanski
(74) *Attorney, Agent, or Firm* — Sughrue Mion, PLLC

(57) ABSTRACT

An aqueous solution includes a compound represented by the Formula (1) which is as defined herein; a preservative; and a betaine compound represented by the Formula (W-2) which is as defined herein, in which a content of the compound represented by the Formula (1) is 5 to 25 mass % with respect to a total mass of the aqueous solution.

14 Claims, 2 Drawing Sheets

AQUEOUS SOLUTION, COLORING COMPOSITION, INK JET RECORDING INK, INK JET RECORDING METHOD, AND INK CARTRIDGE

CROSS REFERENCE TO RELATED APPLICATION

This is a continuation of International Application No. PCT/JP2017/033151 filed on Sep. 13, 2017, and claims priorities from Japanese Patent Application No. 2016-193942 filed on Sep. 30, 2016, the entire disclosures of which are incorporated herein by reference.

BACKGROUND OF THE INVENTION

1. Field of the Invention

The present invention relates to an aqueous solution, a coloring composition, an ink jet recording ink, an ink jet recording method, and an ink cartridge.

2. Description of the Related Art

In the ink jet recording method, as is well-known in the related art, small ink droplets are jetted to be attached to a recording medium such as paper to perform printing. In this printing method, a high-resolution and high-quality image can be printed rapidly and simply using an inexpensive device. Particularly in color printing, recently, a technique of the printing method has been developed as an image forming method capable of replacing photography.

For example, JP5451556B describes an ink jet recording ink that includes a xanthene compound having a specific linking group (—NHCO—) as a dye. In addition, JP2014-201714A describes a dye composition suitable for an ink jet recording ink that includes a xanthene compound having an amino group at a specific position as a dye.

SUMMARY OF THE INVENTION

However, in the ink field, further improvement of performance is required. In particular, regarding a high-concentration aqueous dye solution with which an aqueous ink having excellent printing quality such as color, chroma, printing density, or image fastness can be provided, further improvement of performance is required for the storage stability during a long-term storage and the printing quality and jetting stability of an aqueous ink that is prepared using the aqueous dye solution after a long-term storage.

An object of the present invention is to provide: an aqueous solution that is an aqueous dye solution with which an aqueous ink having excellent printing quality can be provided, excellent storage stability during a long-term storage can be exhibited, and an aqueous ink having excellent printing quality and jetting stability can be provided even in a case where the aqueous ink is prepared using the aqueous dye solution after a long-term storage; a coloring composition that is formed of the aqueous solution; an ink jet recording ink; an ink jet recording method; and an ink cartridge.

The present inventors repeatedly conducted a thorough investigation and found that the object can be achieved by using an aqueous solution that includes a xanthene compound having a specific substituent (—NHSO$_2$—) and a preservative, thereby completing the present invention.

The object of the present invention is achieved by the following means.

<1> An aqueous solution comprising:
a compound represented by the following Formula (1);
a preservative; and
a betaine compound represented by the following Formula (W-2),
wherein a content of the compound represented by the Formula (1) is 5 to 25 mass % with respect to a total mass of the aqueous solution, Formula (1)

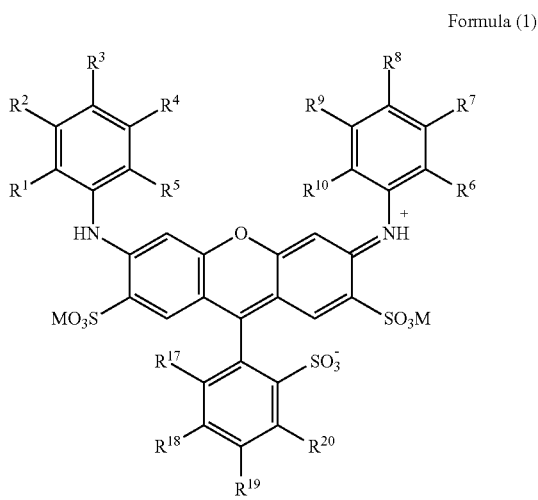

in the Formula (1), $R^1$, $R^5$, $R^6$, and $R^{10}$ each independently represent an alkyl group,
$R^4$, $R^9$, $R^{17}$, $R^{18}$, $R^{19}$, and $R^{20}$ each independently represent a hydrogen atom or a substituent,
$R^2$, $R^3$, $R^7$, and $R^8$ each independently represent a hydrogen atom, an alkyl group, or a substituent represented by the following Formula (A),
at least one of $R^2$, $R^3$, $R^7$, or $R^8$ represents a substituent represented by the following Formula (A), and
M represents a hydrogen atom or a monovalent counter cation, Formula (A)

in the Formula (A), X represents a substituent represented by the following Formula (X1), (X2), or (X3), and
* represents a bond to a benzene ring, Formula (X1)

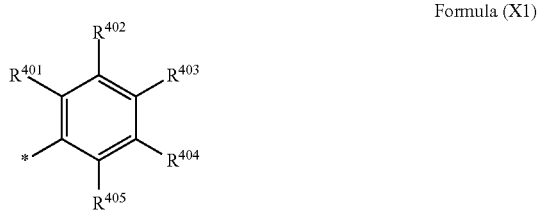

in the Formula (X1), $R^{401}$, $R^{402}$, $R^{403}$, $R^{404}$, and $R^{405}$ each independently represent a hydrogen atom or a substituent.
$R^{401}$, $R^{402}$, $R^{403}$, $R^{404}$, and $R^{405}$ satisfy the following condition (i) or (ii),
* represents a bond to a sulfur atom.

the condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group, and the condition (ii): at least two of $R^{401}$, $R^{402}$, $R^{403}$, $R^{404}$, or $R^{405}$ represent a carboxyl group,

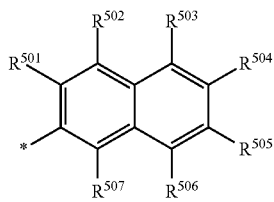

Formula (X2)

in the Formula (X2), $R^{501}$, $R^{502}$, $R^{503}$, $R^{504}$, $R^{505}$, $R^{506}$, and $R^{507}$ each independently represent a hydrogen atom or a substituent, $R^{501}$, $R^{502}$, $R^{503}$, $R^{504}$, $R^{505}$, $R^{506}$, and $R^{507}$ satisfy the following condition (iii) or (iv),

* represents a bond to a sulfur atom, the condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group, and the condition (iv): at least two of $R^{501}$, $R^{502}$, $R^{503}$, $R^{504}$, $R^{505}$, $R^{506}$, or $R^{507}$ represent a carboxyl group, and

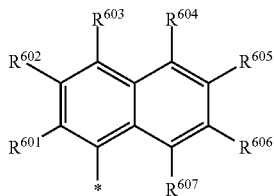

Formula (X3)

in the Formula (X3), $R^{601}$, $R^{602}$, $R^{603}$, $R^{604}$, $R^{605}$, $R^{606}$, and $R^{607}$ each independently represent a hydrogen atom or a substituent, $R^{601}$, $R^{602}$, $R^{603}$, $R^{604}$, $R^{605}$, $R^{606}$, and $R^{607}$ satisfy the following condition (v) or (vi).

* represents a bond to a sulfur atom, the condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group, and the condition (vi): at least two of $R^{601}$, $R^{602}$, $R^{603}$, $R^{604}$, $R^{605}$, $R^{606}$, or $R^{607}$ represent a carboxyl group, and

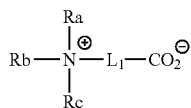

Formula (W-2)

in the Formula (W-2), Ra, Rb, and Rc each independently represent a hydrogen atom, an alkyl group, an aryl group, or a heterocyclic group, at least one of Ra. Rb or Rc has an alkyl group having 8 or more carbon atoms, and $L_1$ represents a divalent linking group.

<2> The aqueous solution according to <1>, in which the compound represented by the Formula (1) is a compound represented by the following Formula (2).

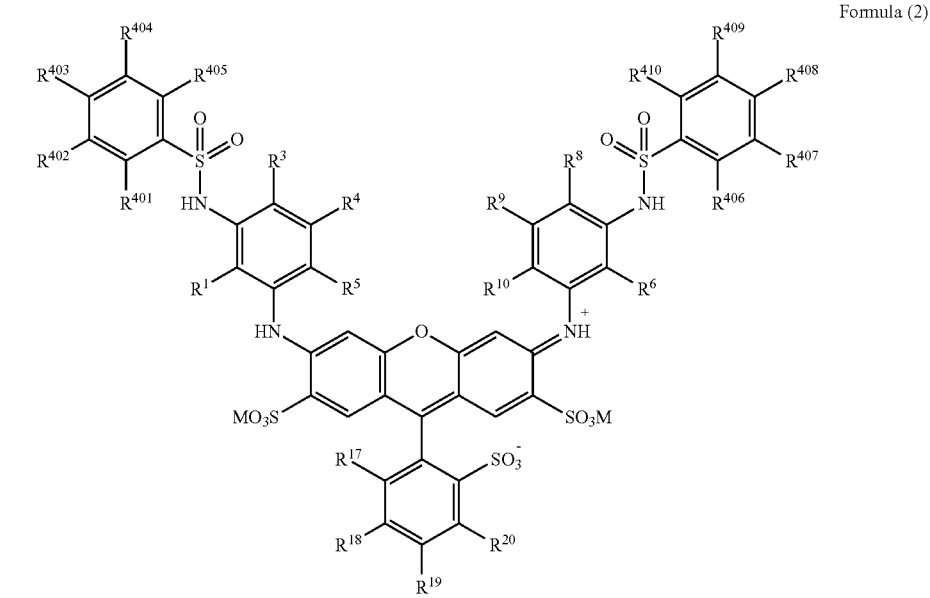

Formula (2)

in the Formula (2), $R^1$, $R^5$, $R^6$, and $R^{10}$ each independently represent an alkyl group, $R^4$, $R^9$, $R^{17}$, $R^{18}$, $R^{19}$, and $R^{20}$ each independently represent a hydrogen atom or a substituent, $R^3$ and $R^8$ each independently represent a hydrogen atom or an alkyl group, $R^{401}$, $R^{402}$, $R^{403}$, $R^{404}$, and $R^{405}$ each independently represent a hydrogen atom or a substituent, $R^{401}$, $R^{402}$, $R^{403}$, $R^{404}$, and $R^{405}$ satisfy the following condition (i-1) or (ii-1), $R^{406}$, $R^{407}$, $R^{408}$, $R^{409}$, and $R^{410}$ each independently represent a hydrogen atom or a substituent, $R^{406}$, $R^{407}$, $R^{408}$, $R^{409}$, and $R^{410}$ satisfy the following condition (i-2) or (ii-2), M represents a hydrogen atom or a monovalent counter cation, the condition (i-1): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group, the condition (ii-1): at least two of $R^{401}$, $R^{402}$, $R^{403}$, $R^{404}$, or $R^{405}$ represent a carboxyl group, the condition (i-2): at least one of $R^{406}$, $R^{407}$, $R^{408}$, $R^{409}$, or $R^{410}$ represents a hydroxyl group and at least one of $R^{406}$, $R^{407}$, $R^{408}$, $R^{409}$, or $R^{410}$ represents a carboxyl group, and the condition (ii-2): at least two of $R^{406}$, $R^{407}$, $R^{408}$, $R^{409}$, or $R^{410}$ represent a carboxyl group.

<3> The aqueous solution according to <2>, in which $R^{401}$, $R^{402}$, $R^{403}$, $R^{404}$, and $R^{405}$ in the Formula (2) satisfy the condition (ii-1), and $R^{406}$, $R^{407}$, $R^{408}$, $R^{409}$, and $R^{410}$ in the Formula (2) satisfy the condition (ii-2).

<4> The aqueous solution according to <1>, in which the compound represented by the Formula (1) is a compound represented by the following Formula (2'), <6> The aqueous solution according to <1>, in which the preservative is at least one selected from the group consisting of a heterocyclic compound, a phenol derivative, a phenoxy ether derivative, and an alkanediol.

<7> The aqueous solution according to <6>, in which the preservative is the heterocyclic compound, and the heterocyclic compound is a thiazole compound or a benzotriazole compound.

<8> The aqueous solution according to <1>, comprising:

two or more kinds of the preservatives.

<9> The aqueous solution according to <1>, in which a total content of the preservative is 0.01 to 0.5 mass % with respect to the total mass of the aqueous solution.

<10> The aqueous solution according to <1>, in which a mass ratio of the compound represented by the Formula (1) to the preservative is 90/10 to 99/1.

<11> The aqueous solution according to <1>, in which a content of the betaine compound is 1 to 10 mass % with respect to the total mass of the aqueous solution.

<12> A coloring composition that is formed using the aqueous solution according to <1>.

<13> An ink jet recording ink that is formed using the aqueous solution according to <1>.

<14> An ink jet recording method comprising:

forming a colored image on a recording material using the ink jet recording ink according to <13>.

<15> An ink cartridge for ink jet recording that is filled with the ink jet recording ink according to <13>.

According to the present invention, it is possible to provide: an aqueous solution that is an aqueous dye solution with which an aqueous ink having excellent printing quality

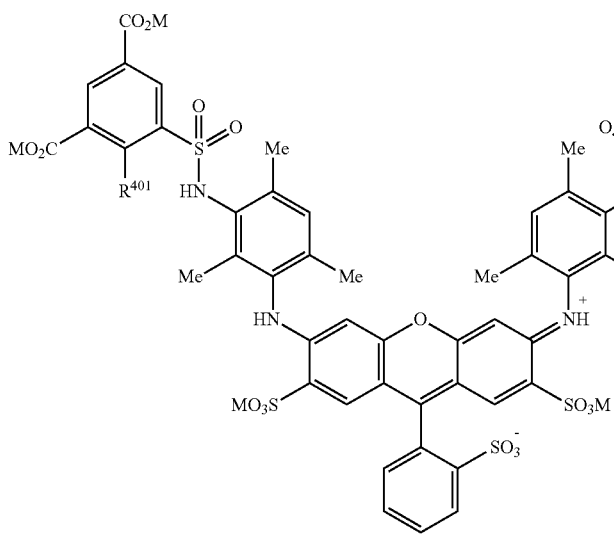

Formula (2')

in the Formula (2'), $R^{401}$ and $R^{406}$ each independently represent a hydrogen atom, a halogen atom, a hydroxyl group, or a methyl group, and M represents a hydrogen atom, a lithium ion, a sodium ion, a potassium ion, or an ammonium ion.

<5> The aqueous solution according to <4>, in which $R^{401}$ and $R^{406}$ in the Formula (2') represent a hydroxyl group.

can be provided, excellent storage stability during a long-term storage can be exhibited, and an aqueous ink having excellent printing quality and jetting stability can be provided even in a case where the aqueous ink is prepared using the aqueous dye solution after a long-term storage; a coloring composition that is formed of the aqueous solution; an ink jet recording ink; an ink jet recording method; and an ink cartridge.

DESCRIPTION OF THE PREFERRED EMBODIMENTS

Figure 1:
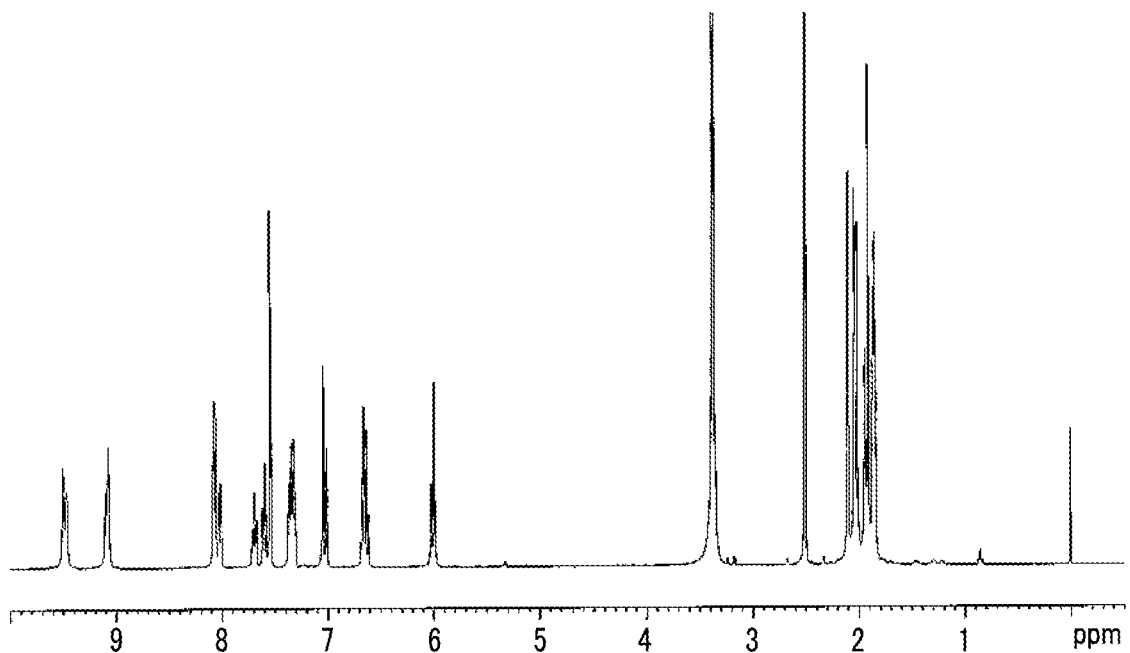
FIG. 1 is a diagram showing a $^1$H-NMR (nuclear magnetic resonance) spectrum of an exemplary compound (1-11) in dimethyl sulfoxide-d6.

Hereinafter, the present invention will be described in detail.

First, specific examples of a substituent in the present invention are defined as a substituent group A.

(Substituent Group A)

Examples of the substituent group A include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a silyl group, and an ionic hydrophilic group. These substituents may further have a substituent, and examples of this substituent include a group selected from the above-described substituent group A.

Examples of the halogen atom include a fluorine atom, a chlorine atom, a bromine atom, and an iodine atom.

Examples of the alkyl group include a linear, branched, or cyclic substituted or unsubstituted alkyl group. In addition, a cycloalkyl group, a bicycloalkyl group, a tricyclo structure having many ring structures, and the like are also included. Alkyl groups (for example, an alkyl group in an alkoxy group or an alkylthio group) in substituents described below are also included in the examples of the above-described alkyl group.

As the alkyl group, an alkyl group having 1 to 30 carbon atoms is preferable, and examples thereof include a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. As the cycloalkyl group, a substituted or unsubstituted cycloalkyl group having 3 to 30 carbon atoms is preferable, and examples thereof include a cyclohexyl group, a cyclopentyl group, and a 4-n-dodecylcyclohexyl group. As the bicycloalkyl group, a substituted or unsubstituted bicycloalkyl group having 5 to 30 carbon atoms is preferable, that is, a monovalent group obtained by removing one hydrogen atom from bicycloalkane having 5 to 30 carbon atoms is preferable, and examples thereof include a bicyclo[1,2,2]heptan-2-yl group and a bicyclo[2,2,2]octan-3-yl group.

Examples of the aralkyl group include a substituted or unsubstituted aralkyl group. As the substituted or unsubstituted aralkyl group, an aralkyl group having 7 to 30 carbon atoms is preferable, and examples thereof include a benzyl group and a 2-phenethyl group.

Examples of the alkenyl group include a linear, branched, or cyclic substituted or unsubstituted alkenyl group. In addition, a cycloalkenyl group and a bicycloalkenyl group are also included.

As the alkenyl group, a substituted or unsubstituted alkenyl group having 2 to 30 carbon atoms is preferable, and examples thereof include a vinyl group, an allyl group, a prenyl group, a geranyl group, and an oleyl group. As the cycloalkenyl group, a substituted or unsubstituted cycloalkenyl group having 3 to 30 carbon atoms is preferable, that is, a monovalent group obtained by removing one hydrogen atom from cycloalkene having 3 to 30 carbon atoms is preferable, and examples thereof include a 2-cyclopenten-1-yl group and a 2-cyclohexen-1-yl group. As the bicycloalkenyl group, a substituted or unsubstituted bicycloalkenyl group can be used. A substituted or unsubstituted bicycloalkenyl group having 5 to 30 carbon atoms is preferable, that is, a monovalent group obtained by removing one hydrogen atom from bicycloalkene having one double bond is preferable, and examples thereof include a bicyclo[2,2,1]hept-2-en-1-yl group and a bicyclo[2,2,2]oct-2-en-4-yl group.

As the alkynyl group, a substituted or unsubstituted alkynyl group having 2 to 30 carbon atoms is preferable, and examples thereof include an ethynyl group, a propargyl group, and a trimethylsilylethynyl group.

As the aryl group, a substituted or unsubstituted aryl group having 6 to 30 carbon atoms is preferable, and examples thereof include a phenyl group, a p-tolyl group, a naphthyl group, an m-chlorophenyl group, and an o-hexadecanoylaminophenyl group.

As the heterocyclic group, a monovalent group obtained by removing one hydrogen atom from a 5- or 6-membered substituted or unsubstituted aromatic or nonaromatic heterocyclic compound is preferable, and a 5- or 6-membered aromatic heterocyclic group having 3 to 30 carbon atoms is more preferable, and examples thereof include a 2-furyl group, a 2-thienyl group, a 2-pyrimidinyl group, and a 2-benzothiazolyl group. Examples of the nonaromatic heterocyclic group include a morpholinyl group.

As the alkoxy group, a substituted or unsubstituted alkoxy group having 1 to 30 carbon atoms is preferable, and examples thereof include a methoxy group, an ethoxy group, an isopropoxy group, a t-butoxy group, an n-octyloxy group, and a 2-methoxyethoxy group.

As the aryloxy group, a substituted or unsubstituted aryloxy group having 6 to 30 carbon atoms is preferable, and examples thereof include a phenoxy group, a 2-methylphenoxy group, a 4-t-butylphenoxy group, a 3-nitrophenoxy group, and a 2-tetradecanoylaminophenoxy group.

As the silyloxy group, a substituted or unsubstituted silyloxy group having 0 to 20 carbon atoms is preferable, and examples thereof include a trimethylsilyloxy group and a diphenylmethylsilyloxy group.

As the heterocyclic oxy group, a substituted or unsubstituted heterocyclic oxy group having 2 to 30 carbon atoms is preferable, and examples thereof include a 1-phenyltetrazole-5-oxy group and a 2-tetrahydropyranyloxy group.

As the acyloxy group, a formyloxy group, a substituted or unsubstituted alkylcarbonyloxy group having 2 to 30 carbon atoms, or a substituted or unsubstituted arylcarbonyloxy group having 6 to 30 carbon atoms is preferable, and examples thereof include an acetyloxy group, a pivaloyloxy group, a stearoyloxy group, a benzoyloxy group, and a p-methoxyphenylcarbonyloxy group.

As the carbamoyloxy group, a substituted or unsubstituted carbamoyloxy group having 1 to 30 carbon atoms is preferable, and examples thereof include a N,N-dimethylcarbamoyloxy group, a N,N-diethylcarbamoyloxy group, a morpholinocarbonyloxy group, a N,N-di-n-octylaminocarbonyloxy group, and an N-n-octylcarbamoyloxy group.

As the alkoxycarbonyloxy group, a substituted or unsubstituted alkoxycarbonyloxy group having 2 to 30 carbon atoms is preferable, and examples thereof include a methoxycarbonyloxy group, an ethoxycarbonyloxy group, a t-butoxycarbonyloxy group, and an n-octylcarbonyloxy group.

As the aryloxycarbonyloxy group, a substituted or unsubstituted aryloxycarbonyloxy group having 7 to 30 carbon atoms is preferable, and examples thereof include a phenoxycarbonyloxy group, a p-methoxyphenoxycarbonyloxy group, and a p-n-hexadecyloxyphenoxycarbonyloxy group.

Examples of the amino group include an alkylamino group, an arylamino group, and a heterocyclic amino group. As the amino group, an amino group, a substituted or unsubstituted alkylamino group having 1 to 30 carbon atoms, a substituted or unsubstituted anilino group having 6 to 30 carbon atoms is preferable, and examples thereof include a methylamino group, a dimethylamino group, an anilino group, an N-methyl-anilino group, a diphenylamino group, and a triazinylamino group.

As the acylamino group, a formylamino group, a substituted or unsubstituted alkylcarbonylamino group having 1 to 30 carbon atoms, or a substituted or unsubstituted arylcarbonylamino group having 6 to 30 carbon atoms is preferable, and examples thereof include an acetylamino group, a pivaloylamino group, a lauroylamino group, a benzoylamino group, and a 3,4,5-tri-n-octyloxyphenylcarbonylamino group.

As the aminocarbonylamino group, a substituted or unsubstituted aminocarbonylamino group having 1 to 30 carbon atoms is preferable, and examples thereof include a carbamoylamino group, a N,N-dimethylaminocarbonylamino group, a N,N-diethylaminocarbonylamino group, and a morpholinocarbonylamino group.

As the alkoxycarbonylamino group, a substituted or unsubstituted alkoxycarbonylamino group having 2 to 30 carbon atoms is preferable, and examples thereof include a methoxycarbonylamino group, an ethoxycarbonylamino group, a t-butoxycarbonylamino group, an n-octadecyloxycarbonylamino group, and an N-methyl-methoxycarbonylamino group.

As the aryloxycarbonylamino group, a substituted or unsubstituted aryloxycarbonylamino group having 7 to 30 carbon atoms is preferable, and examples thereof include a phenoxycarbonylamino group, a p-chlorophenoxycarbonylamino group, and an m-n-octyloxyphenoxycarbonylamino group.

As the sulfamoylamino group, a substituted or unsubstituted sulfamoylamino group having 0 to 30 carbon atoms is preferable, and examples thereof include a sulfamoylamino group, a N,N-dimethylaminosulfonylamino group, and an N-n-octylaminosulfonylamino group.

As the alkyl or arylsulfonylamino group, a substituted or unsubstituted alkylsulfonylamino group having 1 to 30 carbon atoms or a substituted or unsubstituted arylsulfonylamino group having 6 to 30 carbon atoms is preferable, and examples thereof include a methylsulfonylamino group, a butylsulfonylamino group, a phenylsulfonylamino group, a 2,3,5-trichlorophenylsulfonylamino group, and a p-methylphenylsulfonylamino group.

As the alkylthio group, a substituted or unsubstituted alkylthio group having 1 to 30 carbon atoms is preferable, and examples thereof include a methylthio group, an ethylthio group, and an n-hexadecylthio group.

As the arylthio group, a substituted or unsubstituted aylthio group having 6 to 30 carbon atoms is preferable, and examples thereof include a phenylthio group, a p-chlorophenylthio group, and an m-methoxyphenylthio group.

As the heterocyclic thio group, a substituted or unsubstituted heterocyclic thio group having 2 to 30 carbon atoms is preferable, and examples thereof include a 2-benzothiazolylthio group and a 1-phenyltetrazole-5-ylthio group.

As the sulfamoyl group, a substituted or unsubstituted sulfamoyl group having 0 to 30 carbon atoms is preferable, and examples thereof include an N-ethylsulfamoyl group, an N-(3-dodecyloxypropyl)sulfamoyl group, a N,N-dimethylsulfamoyl group, an N-acetylsulfamoyl group, an N-benzoylsulfamoyl group, and an N—(N'-phenylcarbamoyl)sulfamoyl group.

As the alkyl or arylsulfinyl group, a substituted or unsubstituted alkylsulfinyl group having 1 to 30 carbon atoms or a substituted or unsubstituted arylsulfinyl group having 6 to 30 carbon atoms is preferable, and examples thereof include a methylsulfinyl group, an ethylsulfinyl group, a phenylsulfinyl group, and a p-methylphenylsulfinyl group.

As the alkyl or arylsulfonyl group, a substituted or unsubstituted alkylsulfonyl group having 1 to 30 carbon atoms or a substituted or unsubstituted arylsulfonyl group having 6 to 30 carbon atoms is preferable, and examples thereof include a methylsulfonyl group, an ethylsulfonyl group, a phenylsulfonyl group, and a p-methylphenylsulfonyl group.

As the acyl group, a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms and being bonded to a carbonyl group through a carbon atom is preferable, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

As the aryloxycarbonyl group, a substituted or unsubstituted aryloxycarbonyl group having 7 to 30 carbon atoms is preferable, and examples thereof include a phenoxycarbonyl group, an o-chlorophenoxycarbonyl group, an m-nitrophenoxycarbonyl group, and a p-t-butylphenoxycarbonyl group.

As the alkoxycarbonyl group, a substituted or unsubstituted alkoxycarbonyl group having 2 to 30 carbon atoms is preferable, and examples thereof include a methoxycarbonyl group, an ethoxycarbonyl group, a t-butoxycarbonyl group, and an n-octadecyloxycarbonyl group.

As the carbamoyl group, a substituted or unsubstituted carbamoyl group having 1 to 30 carbon atoms is preferable, and examples thereof include a carbamoyl group, an N-methylcarbamoyl group, a N,N-dimethylcarbamoyl group, a N,N-di-n-octylcarbamoyl group, and an N-(methylsulfonyl)carbamoyl group.

As the aryl- or heterocyclic azo group, a substituted or unsubstituted aryl azo group having 6 to 30 carbon atoms or a substituted or unsubstituted heterocyclic azo group having 3 to 30 carbon atoms is preferable, and examples thereof include a phenylazo group, a p-chlorophenylazo group, and a 5-ethylthio-1,3,4-thiadiazol-2-ylazo group.

As the imido group, for example, an N-succinimido group or an N-phthalimido group is preferable.

As the phosphino group, a substituted or unsubstituted phosphino group having 0 to 30 carbon atoms is preferable, and examples thereof include a dimethylphosphino group, a diphenylphosphino group, and a methylphenoxyphosphino group.

As the phosphinyl group, a substituted or unsubstituted phosphinyl group having 0 to 30 carbon atoms is preferable, and examples thereof include a phosphinyl group, a dioctyloxyphosphinyl group, and a diethoxyphosphinyl group.

As the phosphinyloxy group, a substituted or unsubstituted phosphinyloxy group having 0 to 30 carbon atoms is preferable, and examples thereof include a diphenoxyphosphinyloxy group and a dioctyloxyphosphinyloxy group.

As the phosphinylamino group, a substituted or unsubstituted phosphinylamino group having 0 to 30 carbon atoms is preferable, and examples thereof include a dimethoxyphosphinylamino group and a dimethylaminophosphinylamino group.

As the silyl group, a substituted or unsubstituted silyl group having 0 to 30 carbon atoms is preferable, and examples thereof include a trimethylsilyl group, a t-butyldimethylsilyl group, and a phenyldimethylsilyl group.

Examples of the ionic hydrophilic group include a sulfo group, a carboxyl group, a thiocarboxyl group, a sulfino group, a phosphono group, a dihydroxyphosphino group, and a quaternary ammonium group. Among these, a sulfo group or a carboxyl group is more preferable. In addition, the ionic hydrophilic group may include a cation or an anion, and a state including a cation or an anion is called a salt. In addition, the carboxyl group, the phosphono group, or the sulfo group may be in the form of a salt, and examples of a counter cation which forms a salt with the carboxyl group, the phosphono group, or the sulfo group include an ammonium ion, an alkali metal ion (for example, a lithium ion, a sodium ion, or a potassium ion), and an organic cation (for example, a tetramethylammonium ion, a tetramethylguanidium ion, or tetramethylphosphonium). Among these, a lithium salt, a sodium salt, a potassium salt, or an ammonium salt is preferable, a sodium salt or a mixed salt containing a sodium salt as a major component is more preferable, and a sodium salt is most preferable.

In the present invention, in a case where a compound is a salt, the salt is dissociated and present in a water-soluble ink in the form of ions.

[Aqueous Solution] An aqueous solution according to an embodiment of the present invention comprises: a compound represented by the following Formula (1); and a preservative, in which a content of the compound represented by Formula (1) is 5 to 25 mass % with respect to a total mass of the aqueous solution.

<Compound Represented by Formula (1)>

The compound represented by Formula (1) will be described. The compound represented by Formula (1) is used as a dye.

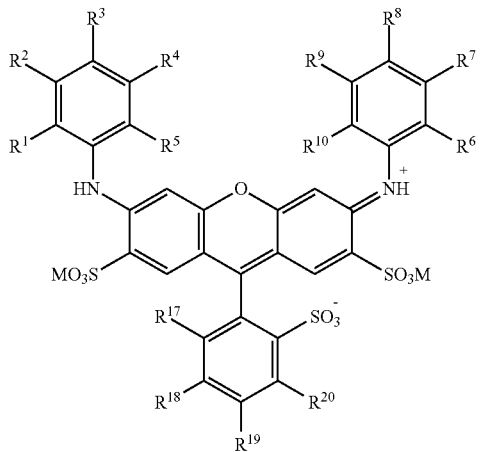

Formula (1)

In Formula (1), $R^1$, $R^5$, $R^6$, and $R^{10}$ each independently represent an alkyl group. $R^4$, $R^9$, $R^{17}$, $R^{18}$, $R^{19}$, and $R^{20}$ each independently represent a hydrogen atom or a substituent. $R^2$, $R^3$, $R^7$, and $R^8$ each independently represent a hydrogen atom, an alkyl group, or a substituent represented by the following Formula (A), and at least one of $R^2$, $R^3$, $R^7$, or $R^8$ represents a substituent represented by the following Formula (A). M represents a hydrogen atom or a monovalent counter cation.

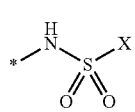

Formula (A)

In Formula (A), X represents a substituent represented by the following Formula (X1), (X2), or (X3). * represents a bond to a benzene ring.

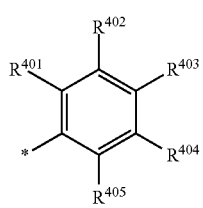

Formula (X1)

In Formula (X1), $R^{401}$, $R^{402}$, $R^{403}$, $R^{404}$, and $R^{405}$ each independently represent a hydrogen atom or a substituent. $R^{401}$, $R^{402}$, $R^{403}$, $R^{404}$, and $R^{405}$ satisfy the following condition (i) or (ii). * represents a bond to a sulfur atom.

Condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group Condition (ii): at least two of $R^{401}$, $R^{402}$, $R^{403}$, $R^{404}$, or $R^{405}$ represent a carboxyl group

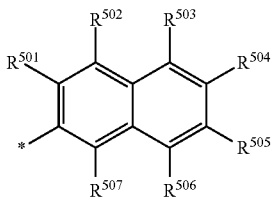

Formula (X2)

In Formula (X2), $R^{501}$, $R^{502}$, $R^{503}$, $R^{504}$, $R^{505}$, $R^{506}$, and $R^{507}$ each independently represent a hydrogen atom or a substituent. $R^{501}$, $R^{502}$, $R^{503}$, $R^{504}$, $R^{505}$, $R^{506}$, and $R^{507}$ satisfy the following condition (iii) or (iv). * represents a bond to a sulfur atom.

Condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group Condition (iv): at least two of $R^{501}$, $R^{502}$, $R^{503}$, $R^{504}$, $R^{505}$, $R^{506}$, or $R^{507}$ represent a carboxyl group

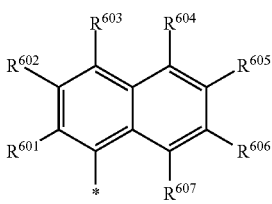

Formula (X3)

In Formula (X3), $R^{601}$, $R^{602}$, $R^{603}$, $R^{604}$, $R^{605}$, $R^{606}$, and $R^{607}$ each independently represent a hydrogen atom or a substituent. $R^{601}$, $R^{602}$, $R^{603}$, $R^{604}$, $R^{605}$, $R^{606}$, and $R^{607}$ satisfy the following condition (v) or (vi). * represents a bond to a sulfur atom.

Condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group Condition (vi): at least two of $R^{601}$, $R^{602}$, $R^{603}$, $R^{604}$, $R^{605}$, $R^{606}$, or $R^{607}$ represent a carboxyl group In Formula (1), $R^{17}$, $R^{18}$, $R^{19}$, and $R^{20}$ each independently represent a hydrogen atom or a substituent. In a case where $R^{17}$, $R^{18}$, $R^{19}$, and $R^{20}$ represent a substituent, the substituent is selected from, for example, the substituent group A.

It is preferable that $R^{17}$, $R^{18}$, $R^{19}$, and $R^{20}$ represent a hydrogen atom.

In Formula (1), $R^1$, $R^5$, $R^6$, and $R^{10}$ each independently represent an alkyl group. From the viewpoint of raw material availability and synthesis easiness, an alkyl group having 1 to 6 carbon atoms is preferable, an alkyl group having 1 to 3 carbon atoms is more preferable, a methyl group or an ethyl group is still more preferable, and a methyl group is still more preferable. In addition, the alkyl group represented by $R^1$, $R^5$, $R^6$, and $R^{10}$ may have a substituent, and this substituent is selected from, for example, the substituent group A.

In Formula (1), $R^4$ and $R^9$ each independently represent a hydrogen atom or a substituent. In a case where $R^4$ and $R^9$ represent a substituent, the substituent is preferably an alkyl group or an ionic hydrophilic group.

As the alkyl group, an alkyl group having 1 to 6 carbon atoms is preferable, an alkyl group having 1 to 3 carbon atoms is more preferable, a methyl group or an ethyl group is still more preferable, and a methyl group is still more preferable.

As the ionic hydrophilic group, a carboxyl group, a sulfo group, or a phosphono group is preferable. Examples of a counter cation of the ionic hydrophilic group include a hydrogen atom (proton), an alkali metal cation (a lithium ion, a sodium ion, or a potassium ion), and an ammonium ion. From the viewpoint of synthesis easiness (easy handleability of dye powder), the counter cation of the ionic hydrophilic group is preferably an alkali metal cation.

$R^4$ and $R^9$ each independently represent preferably a hydrogen atom, a sulfo group, or a carboxyl group, more preferably a hydrogen atom or a sulfo group, and still more preferably a hydrogen atom.

In Formula (1), $R^2$, $R^3$, $R^7$, and $R^8$ each independently represent a hydrogen atom, an alkyl group, or a substituent represented by Formula (A), and at least one of $R^2$, $R^3$, $R^7$, or $R^8$ represents a substituent represented by Formula (A).

In a case where $R^2$, $R^3$, $R^7$, and $R^8$, represent an alkyl group, an alkyl group having 1 to 6 carbon atoms is preferable, an alkyl group having 1 to 3 carbon atoms is more preferable, a methyl group or an ethyl group is still more preferable, and a methyl group is still more preferable. In addition, the alkyl group represented by $R^2$, $R^3$, $R^7$, and $R^8$ may have a substituent, and this substituent is selected from, for example, the substituent group A.

A case where $R^2$ and $R^7$ each independently represent a substituent represented by Formula (A) and $R^3$ and $R^8$ each independently represent an alkyl group or a case where $R^3$ and $R^8$ each independently represent a substituent represented by Formula (A) and $R^2$ and $R^7$ each independently represent an alkyl group is preferable, and a case where $R^2$ and $R^7$ each independently represent a substituent represented by Formula (A) and $R^3$ and $R^8$ each independently represent an alkyl group is more preferable.

In Formula (A), X represents a substituent represented by Formula (X1), (X2), or (X3).

Examples of a counter cation of the carboxyl group represented by Formula (X1), (X2), or (X3) include a hydrogen atom (proton), an alkali metal cation (a lithium ion, a sodium ion, or a potassium ion), and an ammonium ion. The counter cation of the carboxyl group is preferably an alkali metal cation.

In Formula (X1), $R^{401}$, $R^{402}$, $R^{403}$, $R^{404}$, and $R^{405}$ each independently represent a hydrogen atom or a substituent. $R^{401}$, $R^{402}$, $R^{403}$, $R^{404}$, and $R^{405}$ satisfy the following condition (i) or (ii).

Condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group Condition (ii): at least two of $R^{401}$, $R^{402}$, $R^{403}$, $R^{404}$, or $R^{405}$ represent a carboxyl group It is preferable that $R^{401}$, $R^{402}$, $R^{403}$, $R^{404}$, and $R^{405}$ in Formula (X1) satisfy the condition (ii). That is, it is preferable that at least two of $R^{401}$, $R^{402}$, $R^{403}$, $R^{404}$, or $R^{405}$ represent a carboxyl group.

In the condition (ii), in a case where $R^{401}$, $R^{402}$, $R^{403}$, $R^{404}$, and $R^{405}$ represent a substituent other than a carboxyl group, the substituent is selected from, for example, the substituent group A and is preferably a halogen atom, a hydroxyl group, or an alkyl group.

In a case where $R^{401}$, $R^{402}$, $R^{403}$, $R^{404}$, and $R^{405}$ represent a halogen atom, examples of the halogen atom include a fluorine atom, a chlorine atom, a bromine atom, and an iodine atom. In particular, a chlorine atom or a bromine atom is preferable, and a chlorine atom is most preferable from the viewpoint of raw material availability.

In a case where $R^{401}$, $R^{402}$, $R^{403}$, $R^{404}$, and $R^{405}$ represent an alkyl group, an alkyl group having 1 to 6 carbon atoms is preferable, an alkyl group having 1 to 3 carbon atoms is more preferable, a methyl group or an ethyl group is still more preferable, and a methyl group is still more preferable from the viewpoint of raw material availability. In addition, the alkyl group may have a substituent, and this substituent is selected from, for example, the substituent group A.

In a case where $R^{401}$, $R^{402}$, $R^{403}$, $R^{404}$, and $R^{405}$ represent a substituent other than a carboxyl group, it is more preferable that the substituent is a chlorine atom, a hydroxyl group, or a methyl group.

In a case where $R^{401}$, $R^{402}$, $R^{403}$, $R^{404}$, and $R^{405}$ in Formula (X1) satisfy the condition (ii), it is preferable that $R^{402}$ and $R^{404}$ represent a carboxyl group.

Further, it is more preferable that $R^{401}$ represents a hydrogen atom, a halogen atom, a hydroxyl group, or a methyl group and $R^{403}$ and $R^{405}$ represent a hydrogen atom, it is still more preferable that $R^{401}$ represents a chlorine atom, a hydroxyl group, or a methyl group and $R^{403}$ and $R^{405}$ represent a hydrogen atom, and it is still more preferable that $R^{401}$ represents a hydroxyl group and $R^{403}$ and $R^{405}$ represent a hydrogen atom.

In a case where $R^{401}$, $R^{402}$, $R^{403}$, $R^{404}$, and $R^{405}$ in Formula (X1) satisfy the condition (i), among $R^{401}$, $R^{402}$, $R^{403}$, $R^{404}$, and $R^{405}$, the number of hydroxyl groups is preferably 1 to 3, more preferably 1 or 2, and still more preferably 1. The number of carboxyl groups is more preferably 1 to 3, still more preferably 1 or 2, and most preferably 2.

In the condition (i), a case where $R^{403}$ represents a hydroxyl group and $R^{402}$ represents a carboxyl group or a case where $R^{401}$ represents a hydroxyl group and $R^{42}$ represents a carboxyl group is preferable, and a case where $R^{401}$ represents a hydroxyl group and $R^{402}$ represents a carboxyl group is more preferable.

In a case where $R^{401}$, $R^{402}$, $R^{403}$, $R^{404}$, and $R^{405}$ represent a substituent other than a hydroxyl group and a carboxyl group, the substituent is selected from, for example, the substituent group A. In particular, an alkyl group or an alkoxy group is preferable, an alkyl group having 1 to 6 carbon atoms or an alkoxy group is more preferable, an alkyl group having 1 to 3 carbon atoms or an alkoxy group is still more preferable, and a methyl group or a methoxy group is still more preferable. In addition, in a case where $R^{401}$, $R^{402}$, $R^{403}$, $R^{404}$, and $R^{405}$ represent a substituent, examples of the substituent in an aspect different from the above-described aspect include a carboxyl group, a chlorine atom, a nitro group, and a trifluoromethyl group. Among these, a carboxyl group, a chlorine atom, or a nitro group is more preferable, and a carboxyl group is still more preferable. In particular, in a case where $R^{401}$ represents a hydroxyl group and $R^{402}$ represents a carboxyl group, it is preferable that $R^{404}$ represents the above-described substituent (a carboxyl group, a chlorine atom, a nitro group, or a trifluoromethyl group).

Specific examples of the group represented by Formula (X1) will be shown below, but the present invention is not limited to the examples. In structural formulae of the following specific compounds, Me represents a methyl group. * represents a bond to a sulfur atom.

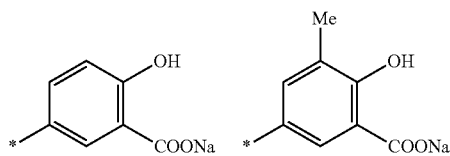

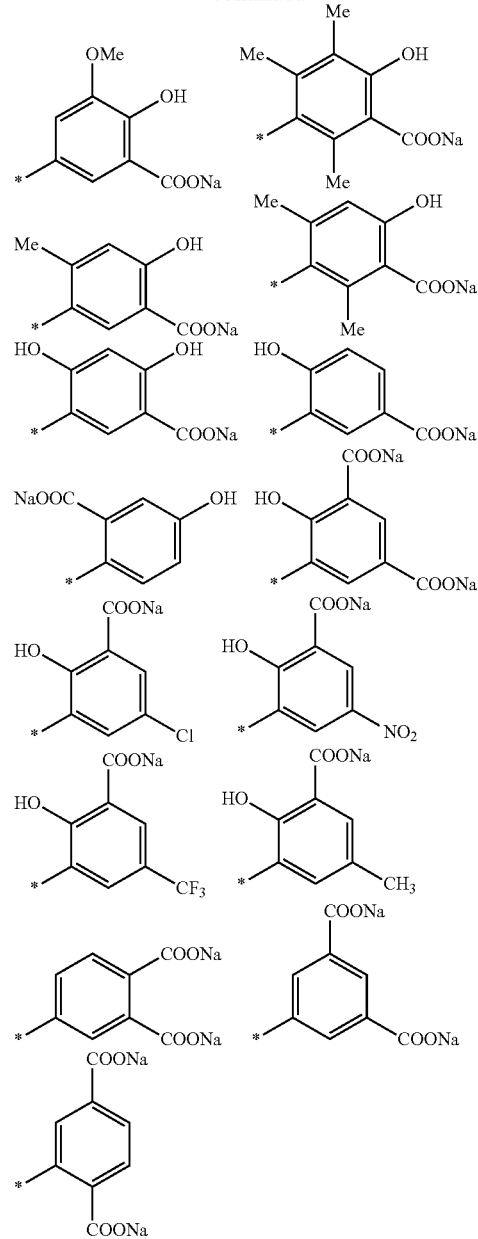

In Formula (X2), $R^{501}$, $R^{502}$, $R^{503}$, $R^{504}$, $R^{505}$, $R^{506}$, and $R^{507}$ each independently represent a hydrogen atom or a substituent. $R^{501}$, $R^{502}$, $R^{503}$, $R^{504}$, $R^{505}$, $R^{506}$, and $R^{507}$ satisfy the following condition (iii) or (iv).

Condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group Condition (iv): at least two of $R^{501}$, $R^{502}$, $R^{503}$, $R^{504}$, $R^{505}$, $R^{506}$, or $R^{507}$ represent a carboxyl group It is preferable that $R^{501}$, $R^{502}$, $R^{503}$, $R^{504}$, $R^{505}$, $R^{506}$ and $R^{507}$ in Formula (X2) satisfy the condition (iv). That is, it is preferable that at least two of $R^{501}$, $R^{502}$, $R^{503}$, $R^{504}$, $R^{505}$, $R^{506}$, or $R^{507}$ represent a carboxyl group.

In the condition (iv), in a case where $R^{501}$, $R^{502}$, $R^{503}$, $R^{504}$, $R^{505}$, $R^{506}$, and $R^{507}$ represent a substituent other than a carboxyl group, the substituent is selected from, for example, the substituent group A and is preferably a halogen atom, a hydroxyl group, or an alkyl group.

In a case where $R^{501}$, $R^{502}$, $R^{503}$, $R^{504}$, $R^{505}$, $R^{506}$, and $R^{507}$ represent a halogen atom, examples of the halogen atom include a fluorine atom, a chlorine atom, a bromine atom, and an iodine atom. In particular, a chlorine atom or a bromine atom is preferable, and a chlorine atom is most preferable.

In a case where $R^{501}$, $R^{502}$, $R^{503}$, $R^{504}$, $R^{505}$, $R^{506}$, and $R^{507}$ represent an alkyl group, an alkyl group having 1 to 6 carbon atoms is preferable, an alkyl group having 1 to 3 carbon atoms is more preferable, a methyl group or an ethyl group is still more preferable, and a methyl group is still more preferable. In addition, the alkyl group may have a substituent, and this substituent is selected from, for example, the substituent group A.

In a case where $R^{501}$, $R^{502}$, $R^{503}$, $R^{504}$, $R^{505}$, $R^{506}$, and $R^{507}$ represent a substituent other than a carboxyl group, it is more preferable that the substituent is a halogen atom, a hydroxyl group, or a methyl group.

In a case where $R^{501}$, $R^{502}$, $R^{503}$, $R^{504}$, $R^{505}$, $R^{506}$, and $R^{507}$ in Formula (X2) satisfy the condition (iii), among $R^{501}$, $R^{502}$, $R^{503}$, $R^{504}$, $R^{505}$, $R^{506}$, and $R^{507}$, the number of hydroxyl groups is preferably 1 to 3, more preferably 1 or 2, and still more preferably 1. The number of carboxyl groups is more preferably 1 or 2 and still more preferably 1.

A case where $R^{504}$ represents a hydroxyl group and $R^{503}$ represents a carboxyl group or a case where $R^{504}$ represents a hydroxyl group and $R^{505}$ represents a carboxyl group is preferable, and a case where $R^{504}$ represents a hydroxyl group and $R^{503}$ represents a carboxyl group is more preferable.

In the condition (iii), in a case where $R^{501}$, $R^{502}$, $R^{503}$, $R^{504}$, $R^{505}$, $R^{506}$, and $R^{507}$ represent a substituent other than a hydroxyl group and a carboxyl group, the substituent is selected from, for example, the substituent group A. In particular, an alkyl group or an alkoxy group is preferable, an alkyl group having 1 to 6 carbon atoms or an alkoxy group is more preferable, an alkyl group having 1 to 3 carbon atoms or an alkoxy group is still more preferable, and a methyl group or a methoxy group is still more preferable.

Specific examples of the group represented by Formula (X2) will be shown below, but the present invention is not limited to the examples. * represents a bond to a sulfur atom.

In Formula (X3), $R^{601}$, $R^{602}$, $R^{603}$, $R^{604}$, $R^{605}$, $R^{606}$, and $R^{607}$ each independently represent a hydrogen atom or a substituent. $R^{601}$, $R^{602}$, $R^{603}$, $R^{604}$, $R^{605}$, $R^{606}$, and $R^{607}$ satisfy the following condition (v) or (vi). * represents a bond to a sulfur atom.

Condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group Condition (vi): at least two of $R^{601}$, $R^{602}$, $R^{603}$, $R^{604}$, $R^{605}$, $R^{606}$, or $R^{607}$ represent a carboxyl group It is preferable that $R^{601}$, $R^{602}$, $R^{603}$, $R^{604}$, $R^{605}$, $R^{606}$, and $R^{607}$ in Formula (X3) satisfy the condition (vi). That is, it is preferable that at least two of $R^{601}$, $R^{602}$, $R^{603}$, $R^{604}$, $R^{605}$, $R^{606}$, or $R^{607}$ represent a carboxyl group.

In the condition (vi), in a case where $R^{601}$, $R^{602}$, $R^{603}$, $R^{604}$, $R^{605}$, $R^{606}$, and $R^{607}$ represent a substituent other than a carboxyl group, the substituent is selected from, for example, the substituent group A and is preferably a halogen atom, a hydroxyl group, or an alkyl group.

In a case where $R^{601}$, $R^{602}$, $R^{603}$, $R^{604}$, $R^{605}$, $R^{606}$, and $R^{607}$ represent a halogen atom, examples of the halogen atom include a fluorine atom, a chlorine atom, a bromine atom, and an iodine atom. In particular, a chlorine atom or a bromine atom is preferable, and a chlorine atom is most preferable.

In a case where $R^{601}$, $R^{602}$, $R^{603}$, $R^{604}$, $R^{605}$, $R^{606}$, and $R^{607}$ represent an alkyl group, an alkyl group having 1 to 6 carbon atoms is preferable, an alkyl group having 1 to 3 carbon atoms is more preferable, a methyl group or an ethyl group is still more preferable, and a methyl group is still more preferable. In addition, the alkyl group may have a substituent, and this substituent is selected from, for example, the substituent group A.

In a case where $R^{601}$, $R^{602}$, $R^{603}$, $R^{604}$, $R^{605}$, $R^{606}$, and $R^{607}$ represent a substituent other than a carboxyl group, it is more preferable that the substituent is a halogen atom, a hydroxyl group, or a methyl group.

In a case where $R^{601}$, $R^{602}$, $R^{603}$, $R^{604}$, $R^{605}$, $R^{606}$, and $R^{607}$ in Formula (X3) satisfy the condition (v), among $R^{601}$, $R^{602}$, $R^{603}$, $R^{604}$, $R^{605}$, $R^{606}$ and $R^{607}$, the number of hydroxyl groups is preferably 1 to 3, more preferably 1 or 2, and still more preferably 1. The number of carboxyl groups is more preferably 1 or 2 and still more preferably 1.

A case where $R^{606}$ represents a hydroxyl group and $R^{605}$ represents a carboxyl group or a case where $R^{603}$ represents a hydroxyl group and $R^{602}$ represents a carboxyl group is preferable, and a case where $R^{606}$ represents a hydroxyl group and $R^{605}$ represents a carboxyl group is more preferable.

In the condition (v), in a case where $R^{601}$, $R^{602}$, $R^{603}$, $R^{604}$, $R^{605}$, $R^{606}$, and $R^{607}$ represent a substituent other than a hydroxyl group and a carboxyl group, the substituent is selected from, for example, the substituent group A. In particular, an alkyl group or an alkoxy group is preferable, an alkyl group having 1 to 6 carbon atoms or an alkoxy group is more preferable, an alkyl group having 1 to 3 carbon atoms or an alkoxy group is still more preferable, and a methyl group or a methoxy group is still more preferable.

Specific examples of the group represented by Formula (X3) will be shown below, but the present invention is not limited to the examples. * represents a bond to a sulfur atom.

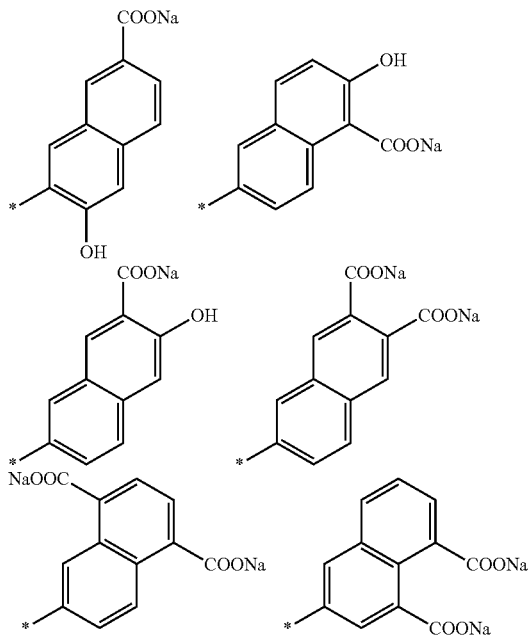

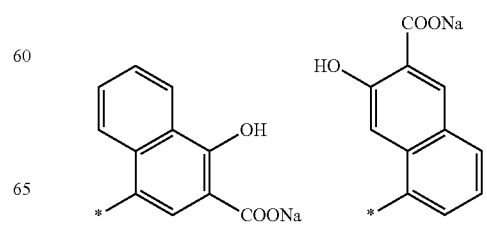

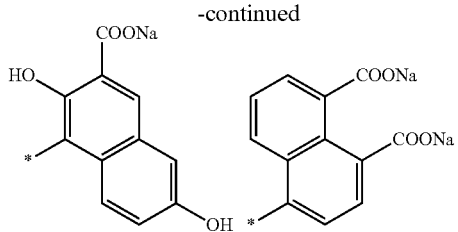

In Formula (1), M represents a hydrogen atom or a monovalent counter cation. In a case where M represents a monovalent counter cation, examples of the monovalent counter cation include an alkali metal cation (for example, a lithium ion, a sodium ion, or a potassium ion) and an ammonium ion. Among these, an alkali metal cation is preferable. In particular, a lithium ion or a sodium ion is more preferable, and a sodium ion is most preferable.

It is preferable that the compound represented by Formula (1) is a compound represented by the following Formula (2), (3), or (4).

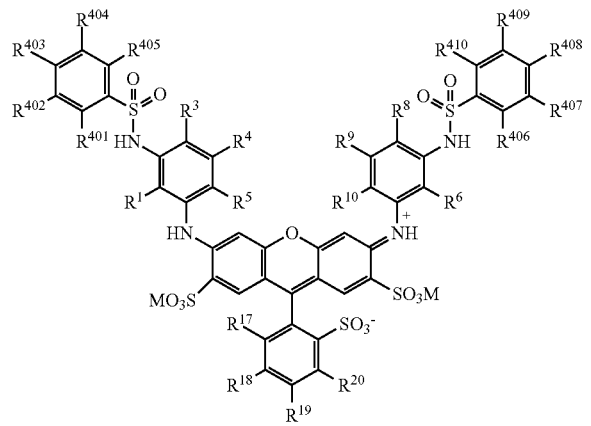

Formula (2)

In Formula (2), $R^1$, $R^5$, $R^6$, and $R^{10}$ each independently represent an alkyl group. $R^4$, $R^9$, $R^{17}$, $R^{18}$, $R^{19}$, and $R^{20}$ each independently represent a hydrogen atom or a substituent. $R^3$ and $R^8$ each independently represent a hydrogen atom or an alkyl group. $R^{401}$, $R^{402}$, $R^{403}$, $R^{404}$, and $R^{405}$ each independently represent a hydrogen atom or a substituent. $R^{401}$, $R^{402}$, $R^{403}$ and, $R^{404}$, and $R^{405}$ satisfy the following condition (i-1) or (ii-1). $R^{406}$, $R^{407}$, $R^{408}$, $R^{409}$, and $R^{410}$ each independently represent a hydrogen atom or a substituent. $R^{406}$, $R^{407}$, $R^{408}$, $R^{409}$, and $R^{410}$ satisfy the following condition (i-2) or (ii-2). M represents a hydrogen atom or a monovalent counter cation.

Condition (i-1): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group Condition (ii-1): at least two of $R^{401}$, $R^{402}$, $R^{403}$, $R^{404}$, or $R^{405}$ represent a carboxyl group Condition (i-2): at least one of $R^{406}$, $R^{407}$, $R^{408}$, $R^{409}$, or $R^{410}$ represents a hydroxyl group and at least one of $R^{406}$, $R^{407}$, $R^{408}$, $R^{409}$, or $R^{410}$ represents a carboxyl group Condition (ii-2): at least two of $R^{406}$, $R^{407}$, $R^{408}$, $R^{409}$, or $R^{410}$ represent a carboxyl group

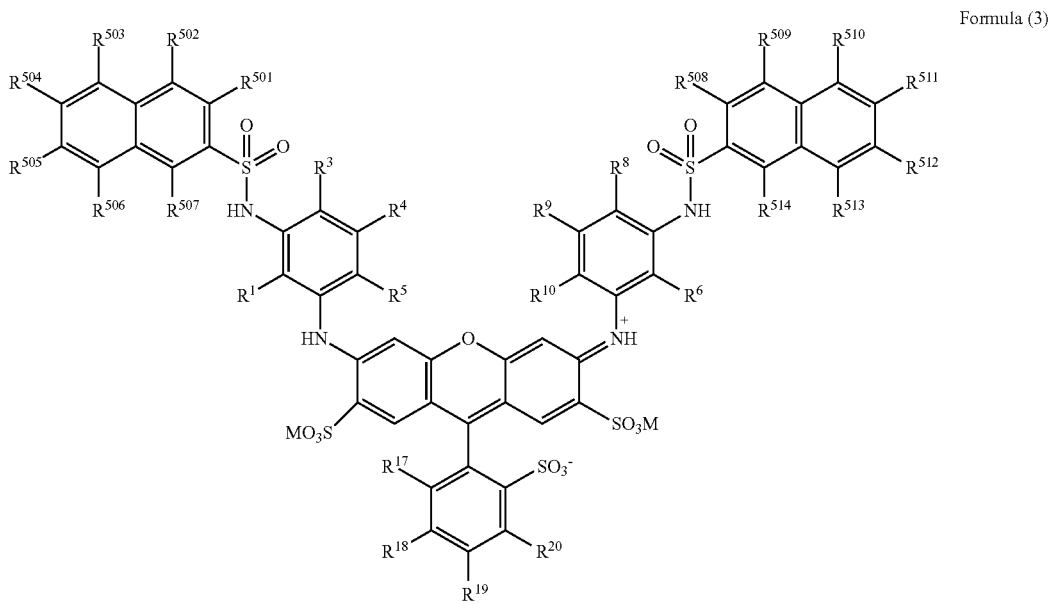

Formula (3)

In Formula (3), $R^1$, $R^5$, $R^6$, and $R^{10}$ each independently represent an alkyl group. $R^4$, $R^9$, $R^{17}$, $R^{18}$, $R^{19}$, and $R^{20}$ each independently represent a hydrogen atom or a substituent. $R^3$ and $R^8$ each independently represent a hydrogen atom or an alkyl group. $R^{501}$, $R^{502}$, $R^{503}$, $R^{504}$, $R^{505}$, $R^{506}$, and $R^{507}$ each independently represent a hydrogen atom or a substituent. $R^{501}$, $R^{502}$, $R^{503}$, $R^{504}$, $R^{505}$, $R^{506}$, and $R^{507}$ satisfy the following condition (iii-1) or (iv-1). $R^{508}$, $R^{509}$, $R^{510}$, $R^{511}$, $R^{512}$, $R^{513}$, and $R^{514}$ each independently represent a hydrogen atom or a substituent. $R^{508}$, $R^{509}$, $R^{510}$, $R^{511}$, $R^{512}$, $R^{513}$, and $R^{514}$ satisfy the following condition (iii-2) or (iv-2). M represents a hydrogen atom or a monovalent counter cation.

Condition (iii-1): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group Condition (iv-1): at least two of $R^{501}$, $R^{502}$, $R^{503}$, $R^{504}$, $R^{505}$, $R^{506}$, or $R^{507}$ represent a carboxyl group Condition (iii-2): at least one of $R^{508}$, $R^{509}$, $R^{510}$, $R^{511}$, $R^{512}$, $R^{513}$, and $R^{514}$ represents a hydroxyl group and at least one of $R^{508}$, $R^{509}$, $R^{510}$, $R^{511}$, $R^{512}$, $R^{513}$, and $R^{514}$ represents a carboxyl group Condition (iv-2): at least two of $R^{508}$, $R^{509}$, $R^{510}$, $R^{511}$, $R^{512}$, $R^{513}$, and $R^{514}$ represent a carboxyl group Condition (v-2): at least one of $R^{608}$, $R^{609}$, $R^{610}$, $R^{611}$, $R^{612}$, $R^{613}$, or $R^{614}$ represents a hydroxyl group and at least one of $R^{608}$, $R^{609}$, $R^{610}$, $R^{611}$, $R^{612}$, $R^{613}$, or $R^{614}$ represents a carboxyl group Condition (vi-2): at least two of $R^{608}$, $R^{609}$, $R^{610}$, $R^{611}$, $R^{612}$, $R^{613}$, or $R^{614}$ represent a carboxyl group $R^1$, $R^4$, $R^5$, $R^6$, $R^{10}$, $R^{17}$, $R^{18}$, $R^{19}$, $R^{20}$, and $R^{20}$, in Formula (2) have the same definitions and the same preferable ranges as $R^1$, $R^4$, $R^5$, $R^6$, $R^9$, $R^{10}$, $R^{17}$, $R^{18}$, $R^{19}$, $R^{20}$, and M in Formula (1), respectively.

$R^3$ and $R^8$ in Formula (2) each independently represent a hydrogen atom or an alkyl group and preferably an alkyl group. As the alkyl group, an alkyl group having 1 to 6 carbon atoms is preferable, an alkyl group having 1 to 3 carbon atoms is more preferable, a methyl group or an ethyl group is still more preferable, and a methyl group is even still more preferable. In addition, the alkyl group may have a substituent, and this substituent is selected from, for example, the substituent group A.

It is preferable that $R^{401}$, $R^{402}$, $R^{403}$, $R^{404}$, and $R^{405}$ in Formula (2) satisfy the condition (ii-1). That is, it is preferable that at least two of $R^{401}$, $R^{402}$, $R^{403}$, $R^{404}$, or $R^{405}$ represent a carboxyl group. $R^{401}$, $R^{402}$, $R^{403}$, $R^{404}$, and $R^{405}$

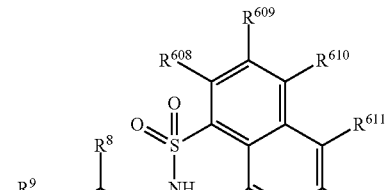

Formula (4)

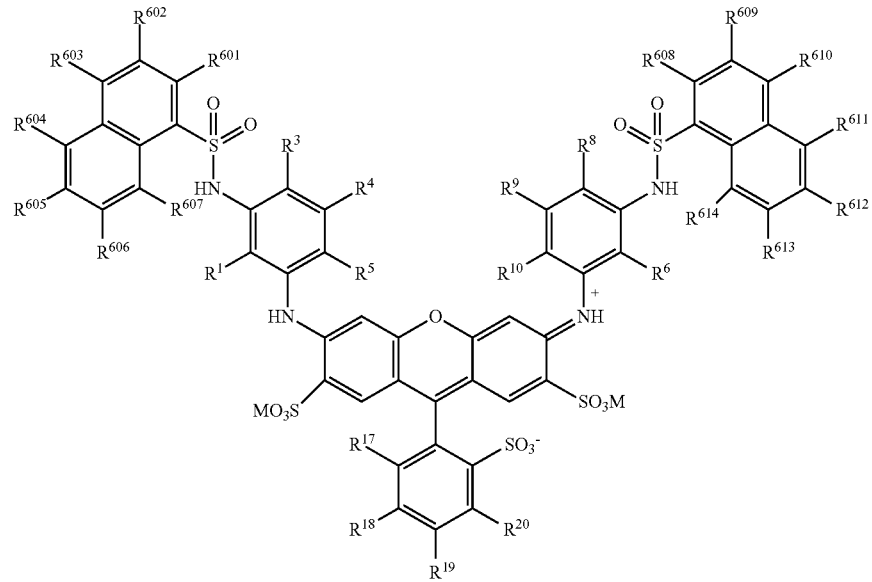

In Formula (4), $R^1$, $R^5$, $R^6$, and $R^{10}$ each independently represent an alkyl group. $R^4$, $R^9$, $R^{17}$, $R^{18}$, $R^{19}$, and $R^{20}$ each independently represent a hydrogen atom or a substituent. $R^3$ and $R^8$ each independently represent a hydrogen atom or an alkyl group. $R^{601}$, $R^{602}$, $R^{603}$, $R^{604}$, $R^{605}$, $R^{606}$, and $R^{607}$ each independently represent a hydrogen atom or a substituent. $R^{601}$, $R^{602}$, $R^{603}$, $R^{604}$, $R^{605}$, $R^{606}$, and $R^{607}$ satisfy the following condition (v-1) or (vi-1). $R^{608}$, $R^{609}$, $R^{610}$, $R^{611}$, $R^{612}$, $R^{613}$, and $R^{614}$ each independently represent a hydrogen atom or a substituent. $R^{608}$, $R^{609}$, $R^{610}$, $R^{611}$, $R^{612}$, $R^{613}$, and $R^{614}$ satisfy the following condition (v-2) or (vi-2). M represents a hydrogen atom or a monovalent counter cation.

Condition (v-1): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group Condition (vi-1): at least two of $R^{601}$, $R^{602}$, $R^{603}$, $R^{604}$, $R^{605}$, $R^{606}$, or $R^{607}$ represent a carboxyl group have the same preferable ranges as $R^{401}$, $R^{402}$, $R^{403}$, $R^{404}$, and $R^{405}$ in Formula (X1), respectively.

It is preferable that $R^{406}$, $R^{407}$, $R^{408}$, $R^{409}$, and $R^{410}$ in Formula (2) satisfy the condition (ii-2). That is, it is preferable that at least two of $R^{406}$, $R^{407}$, $R^{408}$, $R^{409}$, or $R^{410}$ represent a carboxyl group. $R^{406}$, $R^{407}$, $R^{408}$, $R^{409}$, and $R^{410}$ have the same preferable ranges as $R^{401}$, $R^{402}$, $R^{403}$, $R^{404}$, and $R^{405}$ in Formula (2), respectively.

$R^1$, $R^4$, $R^5$, $R^6$, $R^9$, $R^{10}$, $R^{17}$, $R^{18}$, $R^{19}$, $R^{20}$, and M in Formula (3) have the same definitions and the same preferable ranges as $R^1$, $R^4$, $R^5$, $R^6$, $R^9$, $R^{10}$, $R^{17}$, $R^{18}$, $R^{19}$, $R^{20}$, and M in Formula (1), respectively.

$R^3$ and $R^8$ in Formula (3) each independently represent a hydrogen atom or an alkyl group and preferably an alkyl group. As the alkyl group, an alkyl group having 1 to 6 carbon atoms is preferable, an alkyl group having 1 to 3 carbon atoms is more preferable, a methyl group or an ethyl group is still more preferable, and a methyl group is still more preferable. In addition, the alkyl group may have a substituent, and this substituent is selected from, for example, the substituent group A.

It is preferable that $R^{501}$, $R^{502}$, $R^{503}$, $R^{504}$, $R^{505}$, $R^{506}$, and $R^{507}$ in Formula (3) satisfy the condition (iv-1). That is, it is preferable that at least two of $R^{501}$, $R^{502}$, $R^{503}$, $R^{504}$, $R^{505}$, $R^{506}$, or $R^{507}$ represent a carboxyl group. $R^{501}$, $R^{502}$, $R^{503}$, $R^{504}$, $R^{505}$, $R^{506}$, and $R^{507}$ have the same preferable ranges as $R^{501}$, $R^{502}$, $R^{503}$, $R^{504}$, $R^{505}$, $R^{506}$, and $R^{507}$ in Formula (X2), respectively.

It is preferable that $R^{508}$, $R^{509}$, $R^{510}$, $R^{511}$, $R^{512}$, $R^{513}$, and $R^{514}$ in Formula (3) satisfy the condition (iv-2). That is, it is preferable that at least two of $R^{508}$, $R^{509}$, $R^{510}$, $R^{511}$, $R^{512}$, $R^{513}$, or $R^{514}$ represent a carboxyl group. $R^{508}$, $R^{509}$, $R^{510}$, $R^{511}$, $R^{512}$, $R^{513}$, and $R^{514}$ have the same preferable ranges as $R^{501}$, $R^{502}$, $R^{503}$, $R^{504}$, $R^{505}$, $R^{506}$, and $R^{507}$ in Formula (3), respectively.

$R^1$, $R^4$, $R^5$, $R^6$, $R^9$, $R^{10}$, $R^{17}$, $R^{18}$, $R^{19}$, $R^{20}$, and M in Formula (4) have the same definitions and the same preferable ranges as $R^1$, $R^4$, $R^5$, $R^6$, $R^9$, $R^{10}$, $R^{17}$, $R^{18}$, $R^{19}$, $R^{20}$, and M in Formula (1), respectively.

$R^3$ and $R^8$ in Formula (4) each independently represent a hydrogen atom or an alkyl group and preferably an alkyl group. As the alkyl group, an alkyl group having 1 to 6 carbon atoms is preferable, an alkyl group having 1 to 3 carbon atoms is more preferable, a methyl group or an ethyl group is still more preferable, and a methyl group is still more preferable. In addition, the alkyl group may have a substituent, and this substituent is selected from, for example, the substituent group A.

It is preferable that $R^{601}$, $R^{602}$, $R^{603}$, $R^{604}$, $R^{605}$, $R^{606}$, and $R^{607}$ in Formula (4) satisfy the condition (vi-1). That is, it is preferable that at least two of $R^{601}$, $R^{602}$, $R^{603}$, $R^{604}$, $R^{605}$, $R^{606}$, or $R^{607}$ represent a carboxyl group. $R^{601}$, $R^{602}$, $R^{603}$, $R^{604}$, $R^{605}$, $R^{606}$, and $R^{607}$ have the same preferable ranges as $R^{601}$, $R^{602}$, $R^{603}$, $R^{604}$, $R^{605}$, $R^{606}$, and $R^{607}$ in Formula (X3), respectively.

It is preferable that $R^{608}$, $R^{609}$, $R^{610}$, $R^{611}$, $R^{612}$, $R^{613}$, and $R^{614}$ in Formula (4) satisfy the condition (vi-2). That is, it is preferable that at least two of $R^{608}$, $R^{609}$, $R^{610}$, $R^{611}$, $R^{612}$, $R^{613}$, or $R^{614}$ represent a carboxyl group. $R^{608}$, $R^{609}$, $R^{610}$, $R^{611}$, $R^{612}$, $R^{613}$, and $R^{614}$ have the same preferable ranges as $R^{601}$, $R^{602}$, $R^{603}$, $R^{604}$, $R^{605}$, $R^{606}$, and $R^{607}$ in Formula (4), respectively.

It is preferable that the compound represented by Formula (1) is a compound represented by the following Formula (2), and it is more preferable that $R^{401}$, $R^{402}$, $R^{403}$, $R^{404}$, and $R^{405}$ in Formula (2) satisfy the condition (ii-1) and $R^{406}$, $R^{407}$, $R^{408}$, $R^{409}$, and $R^{410}$ in Formula (2) satisfy the condition (ii-2).

It is preferable that the compound represented by Formula (1) or (2) is a compound represented by the following Formula (2').

In Formula (2'), $R^{401}$ and $R^{406}$ each independently represent a hydrogen atom, a halogen atom, a hydroxyl group, or a methyl group. M represents a hydrogen atom, a lithium ion, a sodium ion, a potassium ion, or an ammonium ion.

In Formula (2'), $R^{401}$ and $R^{406}$ each independently represent a hydrogen atom, a halogen atom, a hydroxyl group, or a methyl group.

In a case where $R^{401}$ and $R^{406}$ represent a halogen atom, examples of the halogen atom include a fluorine atom, a chlorine atom, a bromine atom, and an iodine atom. In particular, a chlorine atom or a bromine atom is preferable, and a chlorine atom is most preferable.

$R^{401}$ and $R^{406}$ represent preferably a hydrogen atom, a chlorine atom, a hydroxyl group, or a methyl group, more preferably a hydrogen atom or a hydroxyl group, and most preferably a hydroxyl group.

In Formula (2'), M represents a hydrogen atom, a lithium ion, a sodium ion, a potassium ion, or an ammonium ion.

M represents preferably an alkali metal cation (for example, a lithium ion, a sodium ion, or a potassium ion), more preferably a lithium ion or a sodium ion, and most preferably a sodium ion.

Hereinafter, specific examples of the compound represented by Formula (1) will be shown, but the present invention is not limited thereto. In the following specific structural formulae of the compounds, Me represents a methyl group, and Et represents an ethyl group.

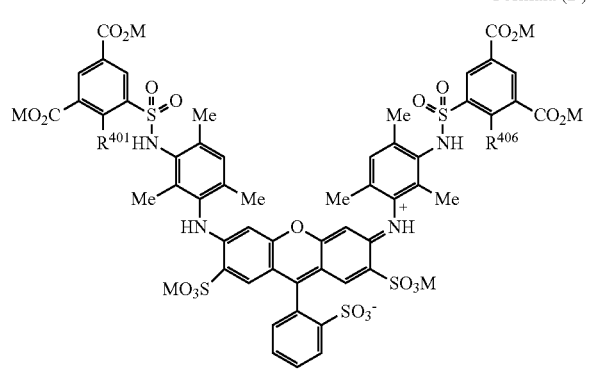

-continued
(1-13)
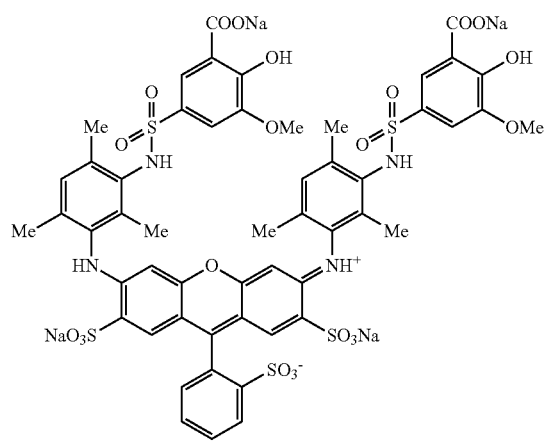
(1-16)
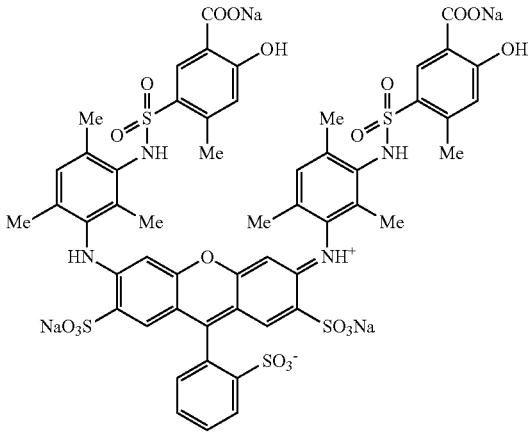
(1-14)
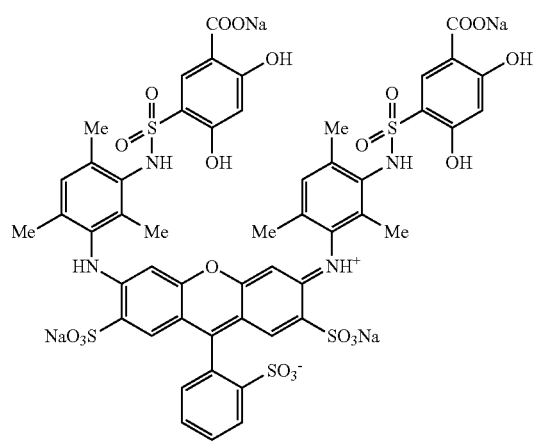
(1-17)
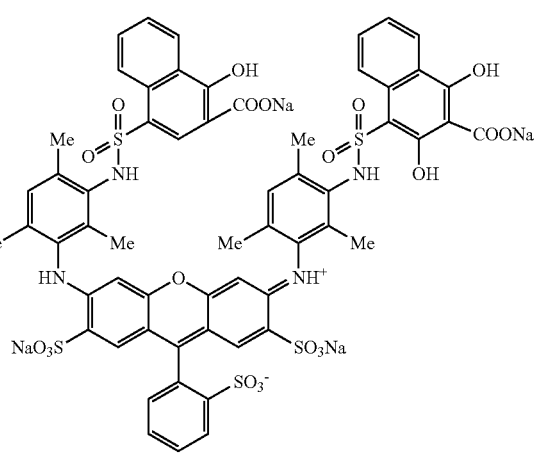
(1-15)
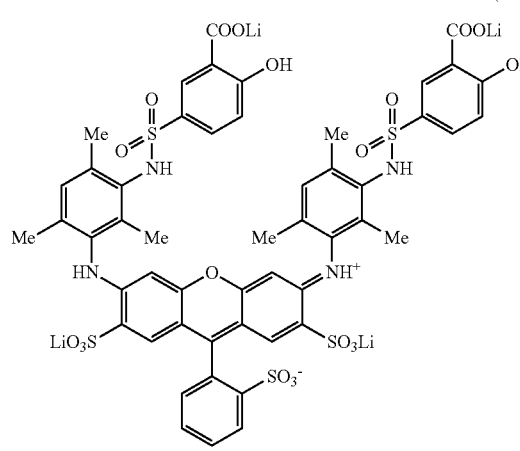
(1-18)
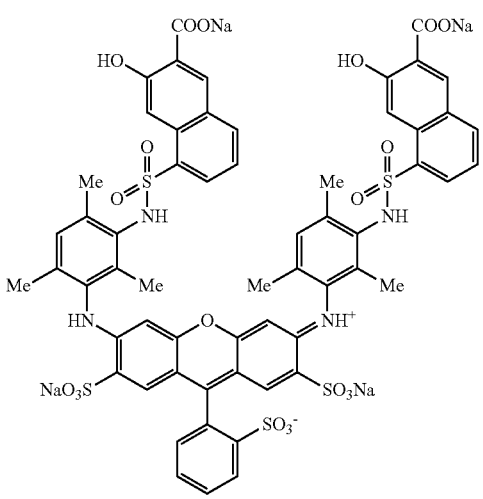

(1-19)
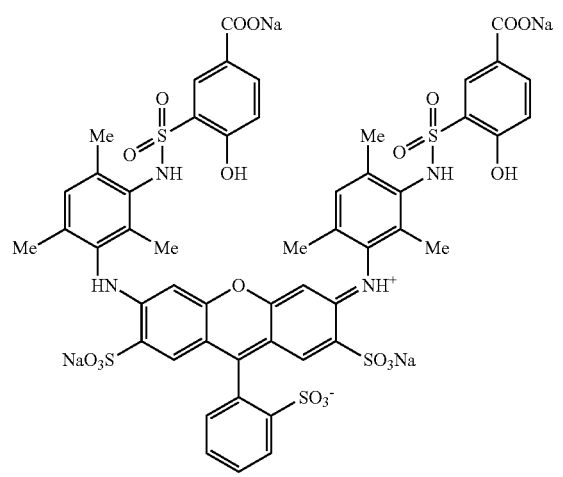
(1-20)
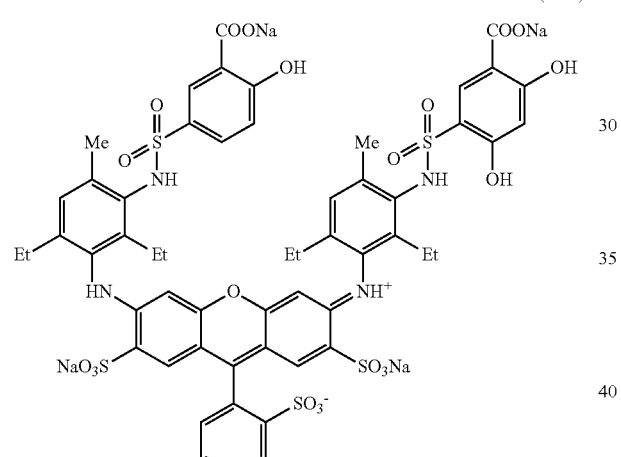
(1-21)
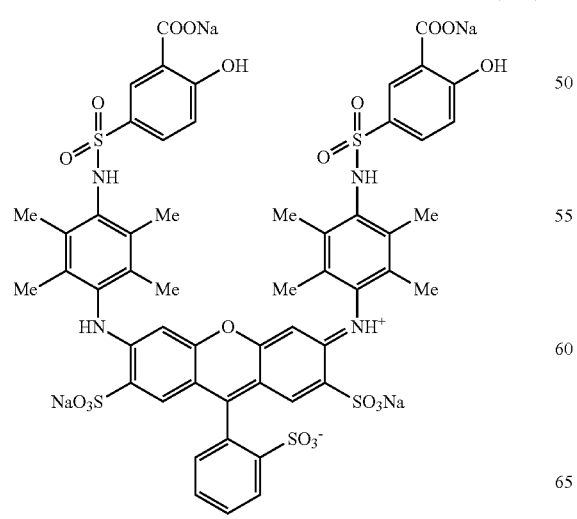
(1-22)
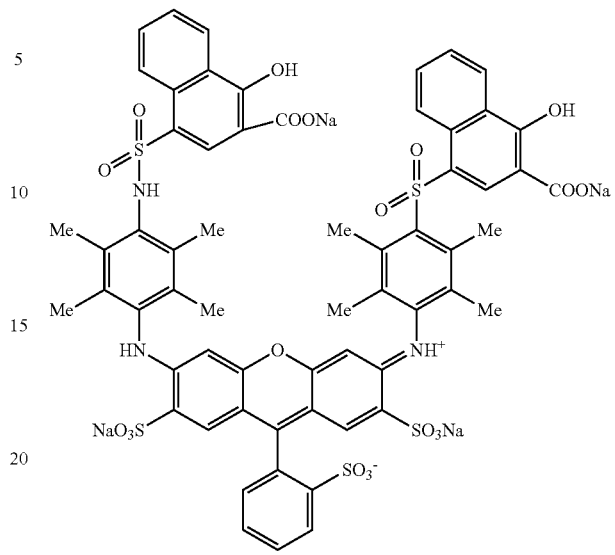
(1-23)
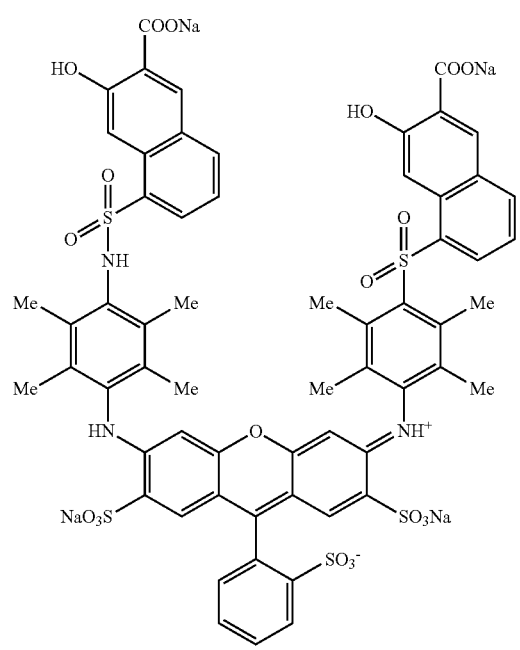
(1-25)
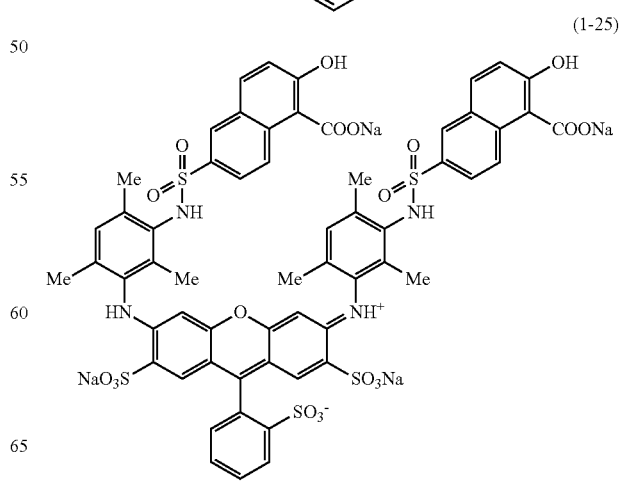

(1-26)
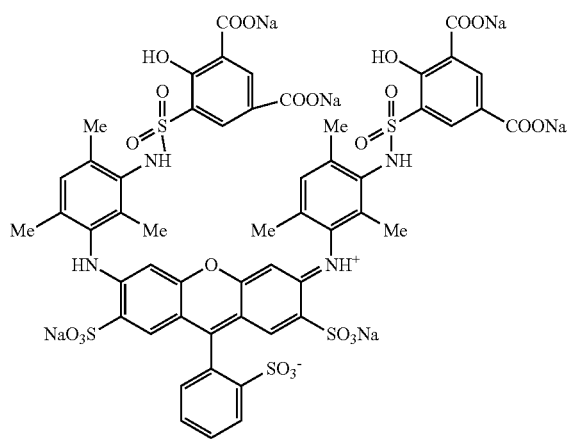
(1-30)
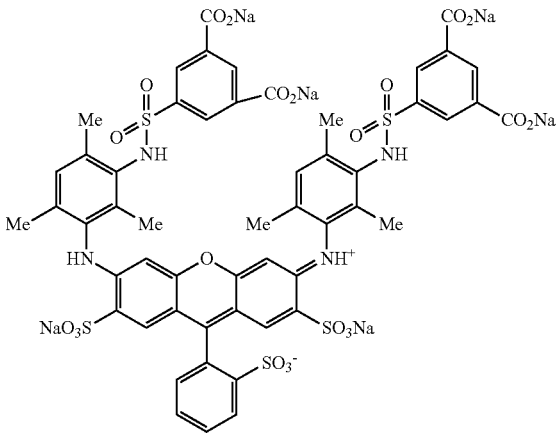
(1-28)
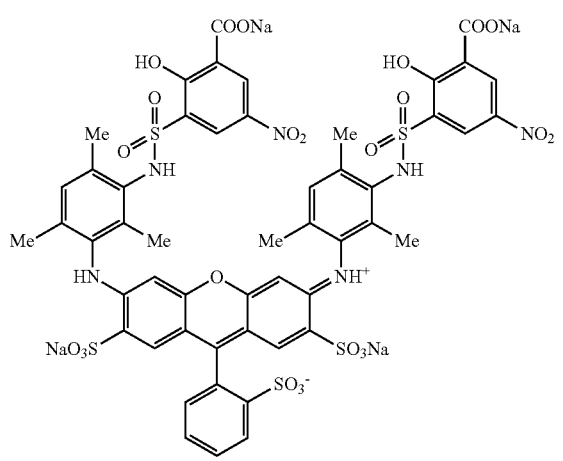
(1-31)
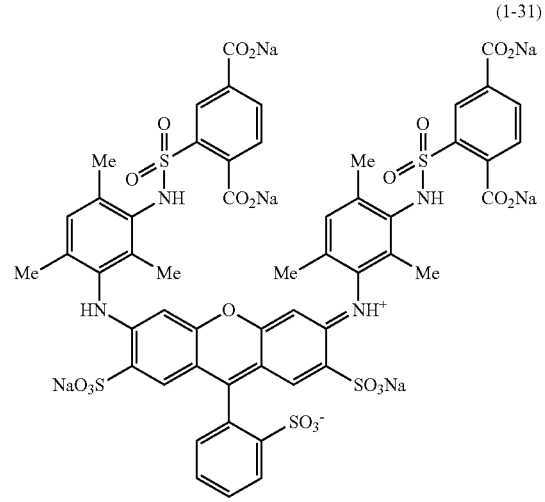
(1-29)
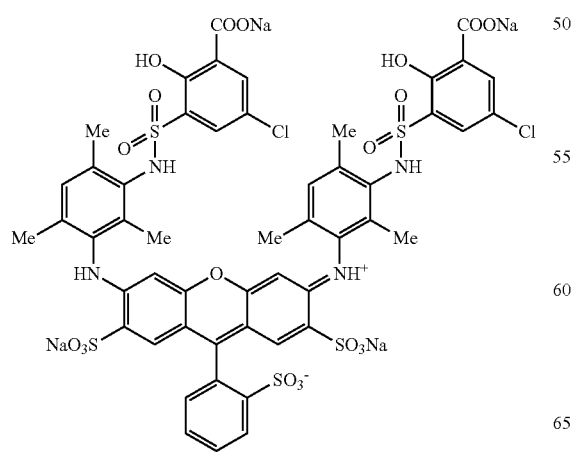
(1-32)
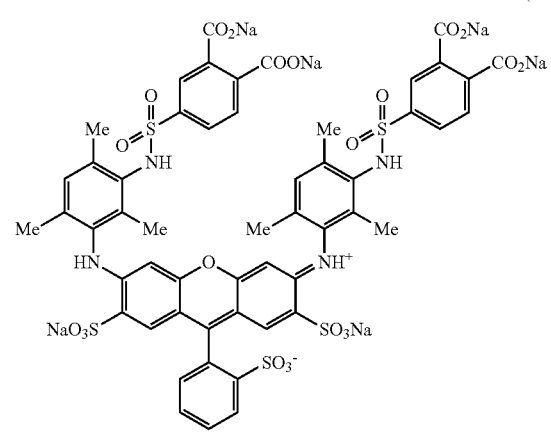

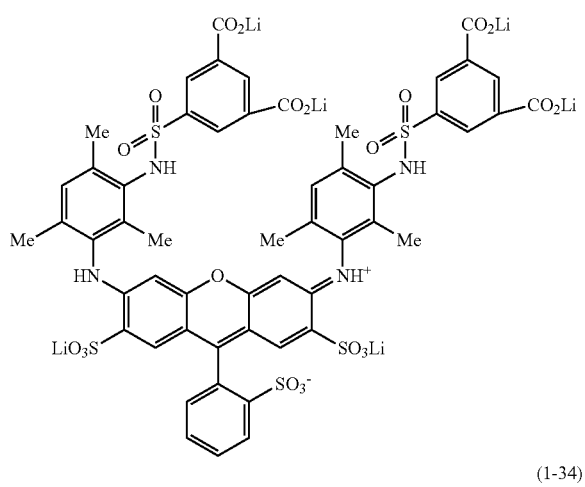

(1-33)

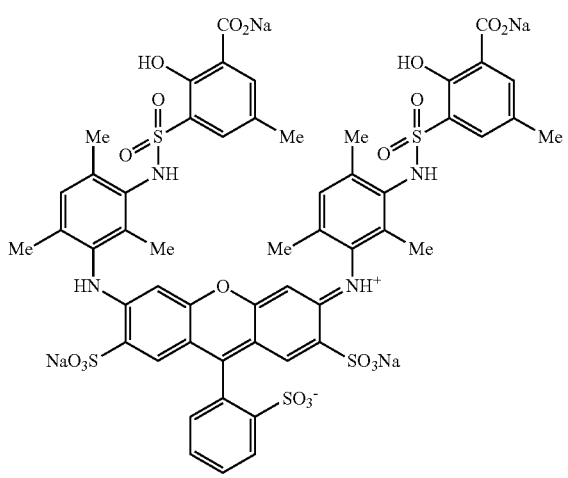

(1-34)

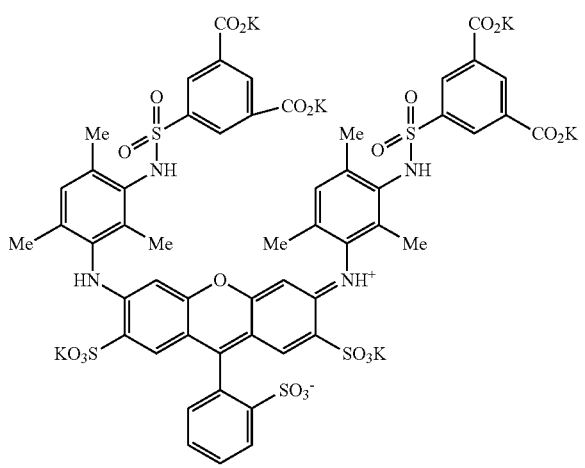

(1-35)

An exemplary specific synthesis method of the compound represented by Formula (1) will be described in Examples below.

The content of the compound represented by Formula (1) in the aqueous solution according to the embodiment of the present invention is 5 to 25 mass %, preferably 6 to 15 mass %, and still more preferably 7 to 12 mass % with respect to the total mass of the aqueous solution.

By adjusting the content of the compound represented by Formula (1) in the aqueous solution to be 5 mass % or higher, the formulation of an ink jet recording ink is simple. In addition, by adjusting the content of the compound represented by Formula (1) in the aqueous solution to be 25 mass % or lower, long-term storage stability can be imparted to the aqueous solution.

<Preservative>

Next, the preservative will be described.

In the present invention, the preservative refers to a compound having a function of preventing the generation and growth of microorganisms, particularly bacteria and fungi (molds).

By using the preservative in the aqueous solution according to the embodiment of the present invention, the generation of molds even after long-term storage of the aqueous solution can be suppressed. In addition, even in a case where an ink jet printer performs printing using an ink jet recording ink prepared using the aqueous solution after long-term storage, ink clogging in a nozzle or the like is not likely to occur, and a high-quality printed material can be obtained.

As the preservative that can be used in the present invention, various preservatives can be used.

Examples of the preservative include an inorganic preservative including a heavy metal ion (for example, a preservative including a silver ion) and a salt. Examples of the organic preservative that can be used include a quaternary ammonium salt (for example, tetrabutylammonium chloride, cetylpyridinium chloride, or benzyltrimethylammonium chloride), a phenol derivative (for example, phenol, cresol, butylphenol, xylenol, or bisphenol), a phenoxy ether derivative (for example, phenoxy ethanol), a heterocyclic compound (for example, benzotriazole, PROXEL, or 1,2-benzisothiazolin-3-one), an alkanediol (for example, pentylene glycol (1,2-pentanediol), isopentyldiol (3-methyl-1,3-butanediol), or hexanediol (for example, 1,2-hexanediol), caprylyl glycol (for example, 1,2-octanediol), an acid amide, a carbamic acid, a carbamate, an amidine, a guanidine, a pyridine (for example, sodium pyridinethione-1-oxide), a thiazine, a triazine, a pyrrole, an imidazole, an oxazole, an oxazine, a thiazole, a thiathiazine, a thiourea, a thiosemicarbazide, a dithiocarbamate, a sulfide, a sulfoxide, a sulfone, a sulfamide, an antibiotic substance (for example, penicillin or tetracycline), sodium dehydroacetate, sodium benzoate, p-hydroxybenzoic acid ethyl ester, and a salt thereof. As the preservative, at least one kind selected from the group consisting of a heterocyclic compound, a phenol derivative, a phenoxy ether derivative, and an alkanediol is preferable. In addition, a preservative described in, for example, "Handbook of Antimicrobial & Antifungal Agents" (Gihodo, 1986) or "Journal of Antibacterial and Antifungal Agents" (Editorial Committe of the Society for Antimicrobial and Antifungal Agents, Japan) may also be used.

As the compounds, various compounds having an oil-soluble structure or a water-soluble structure can be used, and a water-soluble compounds is preferable.

The aqueous solution according to the embodiment of the present invention may include two or more preservatives. In the present invention, in a case where two or more preservatives are used in combination, the effects of the present invention can be more favorably exhibited. For example, in a case where a recording image is printed using the aqueous solution or a coloring composition or an ink jet recording ink prepared using the aqueous solution, the storage stability, in particular, color stability of the recording image is improved, and in a case where a recording image is printed with an ink jet printer using an ink jet recording ink prepared using the aqueous solution after a long-term storage, the ink jetting stability is significantly improved. The reason for this is presumed to be that bacteria come into contact with two or more preservatives such that the bacteria are prevented from acquiring resistance to each of the preservatives.

In a case where two or more preservatives are used in combination, it is preferable that the preservatives have different skeletons of chemical structures. In addition, in a case where two or more preservatives are included, it is preferable that at least one preservative is a heterocyclic compound, a phenol derivative, a phenoxy ether derivative, or an alkanediol, and it is more preferable that at least one preservative is a heterocyclic compound. For example, a combination of a heterocyclic compound and a phenoxy ether derivative, a combination of a heterocyclic compound and a phenol derivative, or a combination of a heterocyclic compound and an alkanediol is preferable.

Further, as the heterocyclic compound, a thiazole compound or a benzotriazole compound is preferable.

The thiazole compound functions as a preservative, in particular, a fungicide. Examples of the thiazole compound include benzisothiazolin, isothiazoline, 1,2-benzisothiazolin-3-one, 5-chloro-2-methyl-4-isothiazolin-3-one, 2-(thiocyanomethylthio)benzothiazole, 2-mercaptobenzothiazole, and 3-allyloxy-1,2-benzisothiazole-1,1-oxide. In addition, as a thiazole fungicide, Proxel (trade name) series (for example, BDN, BD20, GXL, LV, XL II, or Ultra 10, manufactured and sold by Arch Chemical, Inc.) can also be used.

As the benzotriazole compound, among preservatives, in particular, a metallic material (in particular, Alloy 42 (a nickel-iron alloy including 42% nickel) that functions as a rust inhibitor and constitute an ink jet head can prevent the generation of rust caused by the contact with ink. Examples of the benzotriazole compound include 1H-benzotriazole, 4-methyl-1H-benzotriazole, 5-methyl-1H-benzotriazole, and a sodium salt or a potassium salt thereof.

In a case where two or more preservatives are used in combination, a content ratio between the preservatives is not particularly limited. The content of each of the preservatives is preferably 1 mass % or higher, more preferably 10 mass % or higher, and still more preferably 20 mass % or higher with respect to the total content of the preservatives. In addition, the content of each of the preservatives is preferably 99 mass % or lower, more preferably 90 mass % or lower, and still more preferably 80 mass % or lower with respect to the total content of the preservatives. By adjusting the content to be in the above-described range, the effects of the respective preservatives can be effectively obtained, and a synergistic effect between the preservatives can also be easily obtained. In addition, while maintaining the effects of the preservatives, the possibility that a person that comes into contact with ink, in particular, a person that is sensitive to the preservatives develops a skin rash can also be reduced.

The content of the preservative in the aqueous solution according to the embodiment of the present invention (in a case where the aqueous solution according to the embodiment of the present invention includes two or more preservatives, the total content thereof) may be in a wide range, and is preferably 0.001 to 10 mass %, more preferably 0.005 to 2.0 mass %, still more preferably 0.01 to 0.5 mass %, and still more preferably 0.01 to 0.1 mass % with respect to the total mass of the aqueous solution. By adjusting the content to be 0.001 to 10 mass %, the effects of the preservative can be more effectively obtained, and the formation of precipitates can be suppressed.

In the aqueous solution according to the embodiment of the present invention, a mass ratio of the compound represented by Formula (1) to the preservative (compound represented by Formula (1)/preservative) is preferably 90/10 to 99/1.

In the above-described range, both of an effect of stably dissolving the compound represented by Formula (1) in the aqueous solution according to the embodiment of the present invention and an effect of preventing the generation and growth of microorganisms, particularly bacteria and fungi (molds) can be simultaneously obtained.

<Betaine Compound>

Optionally it is preferable that the aqueous solution according to the embodiment of the present invention includes a betaine compound. It is preferable that the aqueous solution according to the embodiment of the present invention including the betaine compound because the formulation design of an ink jet recording ink and the preparation thereof during manufacturing can be made to be simple.

Further, in a case where the aqueous solution according to the embodiment of the present invention is prepared and used as an ink jet recording ink, moisture (blurring) resistance of an ink jet printed material is improved.

It is preferable that the betaine compound which is preferably used in the present invention is a betaine surfactant having surface activity.

The betaine compound described herein refers to a compound having both a cationic site and an anionic site in the molecules.

Examples of the cationic site include an amine nitrogen atom, a heteroaromatic nitrogen atom, a boron atom having four bonds with carbon, and a phosphorus atom. Among these, an amine nitrogen atom or a heteroaromatic nitrogen atom is preferable. In particular, a quaternary nitrogen atom is more preferable.

Examples of the anionic site include a hydroxyl group, a thio group, a sulfonamide group, a sulfo group, a carboxyl group, an imido group, a phosphate group, and a phosphonate group. Among these, a carboxyl group or a sulfo group is preferable. The electric charge of the molecules as a whole may be cationic, anionic, or neutral and is preferably neutral.

As the betaine compound, a compound represented by the following Formula (W-1) is preferably used.

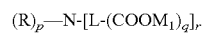 Formula (W-1)

In the formula, R represents a hydrogen atom, an alkyl group, an aryl group, or a heterocyclic group. L represents a (q+1)-valent linking group. $M_1$ represents a hydrogen atom or a monovalent counter cation, and in a case where $M_a$ represents a counter ion of an ammonium ion including the N atom in the formula, this counter ion does not exist as a cation. q represents an integer of 1 or more, and r represents an integer of 1 to 4. p represents an integer of 0 to 3, and p+r represents 3 or 4. In a case where p+r represents 4, the N atom is a protonated ammonium atom (=N$^+$=). In a case where q represents 2 or more, COOM$_1$'s may be the same as or different from each other. In a case where r represents 2 or more, L-(COOM$_1$)$_q$'s may be the same as or different from each other. In a case where p represents 2 or more, R's may be the same as or different from each other.

In the formula, R represents a hydrogen atom, an alkyl group (which may be substituted; preferably an alkyl group having 1 to 20 carbon atoms; for example, a methyl group, an ethyl group, a propyl group, a butyl group, a hexyl group, an octyl group, a dodecyl group, a cetyl group, a stearyl group, or an oleyl group), an aryl group (which may be substituted; preferably an aryl group having 6 to 20 carbon atoms; for example, a phenyl group, a tolyl group, a xylyl group, a naphthyl group, a cumyl group, or a dodecylphenyl group), a heterocyclic group (which may be substituted; preferably a heterocyclic group having 2 to 20 carbon atoms; for example, a pyridyl group or a quinolyl group), and may be linked to each other to form a cyclic structure. Among these, an alkyl group is preferable.

L represents a (q+1)-valent linking group. As an example of the (q 1)-valent linking group, a (q+1)-valent linking group having an alkylene group, an arylene group, or the like as a basic constitutional unit is preferable. A linking main chain portion may include a heteroatom such as an oxygen atom, a sulfur atom, or a nitrogen atom.

R or L may be substituted with various substituents. Examples of the substituents include an alkyl group (having preferably 1 to 20 carbon atoms, more preferably 1 to 12 carbon atoms, and still more preferably 1 to 8 carbon atoms; for example, methyl, ethyl, iso-propyl, tert-butyl, n-octyl, n-decyl, n-hexadecyl, cyclopropyl, cyclopentyl, or cyclohexyl), an alkenyl group (having preferably 2 to 20 carbon atoms, more preferably 2 to 12 carbon atoms, and still more preferably 2 to 8 carbon atoms; for example, vinyl, allyl, 2-butenyl, or 3-pentenyl), an alkynyl group (having preferably 2 to 20 carbon atoms, more preferably 2 to 12 carbon atoms, and still more preferably 2 to 8 carbon atoms; for example, propargyl or 3-pentynyl), an aryl group (having preferably 6 to 30 carbon atoms, more preferably 6 to 20 carbon atoms, and still more preferably 6 to 12 carbon atoms; for example, phenyl, p-methylphenyl or naphtyl), an amino group (having preferably 0 to 20 carbon atoms, more preferably 0 to 12 carbon atoms, still more preferably 0 to 6 carbon atoms; for example, amino, methylamino, dimethylamino, diethylamino, diphenylamino, or dibenzylamino), an alkoxy group (having preferably 1 to 20 carbon atoms, more preferably 1 to 12 carbon atoms, and still more preferably 1 to 8 carbon atoms; for example, methoxy, ethoxy; or butoxy), an aryloxy group (having preferably 6 to 20 carbon atoms, more preferably 6 to 16 carbon atoms, and still more preferably 6 to 12 carbon atoms; for example, phenyloxy or 2-naphtyloxy), an acyl group (having preferably 1 to 20 carbon atoms, more preferably 1 to 16 carbon atoms, and still more preferably 1 to 12 carbon atoms; for example, acetyl, benzoyl, formyl or pivaloyl), an alkoxycarbonyl groups (having preferably 2 to 20 carbon atoms, more preferably 2 to 16 carbon atoms, and still more preferably 2 to 12 carbon atoms; for example, methoxycarbonyl or ethoxycarbonyl), an aryloxycarbonyl group (having preferably 7 to 20 carbon atoms, more preferably 7 to 16 carbon atoms, and still more preferably 7 to 10 carbon atoms; for example, phenyloxycarbonyl), an acyloxy group (having preferably 2 to 20 carbon atoms, more preferably 2 to 16 carbon atoms, and still more preferably 2 to 10 carbon atoms; for example, acetoxy or benzoyloxy), an acylamino group (having preferably 2 to 20 carbon atoms, more preferably 2 to 16 carbon atoms, and still more preferably 2 to 10 carbon atoms; for example, acetylamio or benzoylamino), an alkoxycarbonylamino group (having preferably 2 to 20 carbon atoms, more preferably 2 to 16 carbon atoms, and still more preferably 2 to 12 carbon atoms; for example, methoxy-carbonylamino), an aryloxycarbonylamino group (having preferably 7 to 20 carbon atoms, more preferably 7 to 16 carbon atoms, and still more preferably 7 to 12 carbon atoms; for example, phenyloxycarbonylamino), a sulfonylamino group (having preferably 1 to 20 carbon atoms, more preferably 1 to 16 carbon atoms, and still more preferably 1 to 12 carbon atoms; for example, methanesulfonylamino or benzenesulfonylamino), a sulfamoyl group (having preferably 0 to 20 carbon atoms, more preferably 0 to 16 carbon atoms, and still more preferably 0 to 12 carbon atoms; for example, sulfamoyl, methylsulfamoyl, dimethylsulfamoyl, or phenylsulfamoyl), a carbamoyl group (having preferably 1 to 20 carbon atoms, more preferably 1 to 16 carbon atoms, and still more preferably 1 to 12 carbon atoms; for example, carbamoyl, methylcarbamoyl, diethylcarbamoyl or phenylcarbamoyl), an alkylthio group (having preferably 1 to 20 carbon atoms, more preferably 1 to 16 carbon atoms, and still more preferably 1 to 12 carbon atoms; for example, methylthio or ethylthio), an arylthio group (having preferably 6 to 20 carbon atoms, more preferably 6 to 16 carbon atoms, and still more preferably 6 to 12 carbon atoms; for example, phenylthio), a sulfonyl group (having preferably 1 to 20 carbon atoms, more preferably 1 to 16 carbon atoms, and still more preferably 1 to 12 carbon atoms; for example, mesyl or tosyl), a sulfinyl group (having preferably 1 to 20 carbon atoms, more preferably 1 to 16 carbon atoms, and still more preferably 1 to 12 carbon atoms; for example, methanesulfinyl or benzenesulfinyl), a ureido group (having preferably 1 to 20 carbon atoms, more preferably 1 to 16 carbon atoms, and still more preferably 1 to 12 carbon atoms; for example, ureido, methylureido or phenylureido), a phosphoric amide group (having preferably 1 to 20 carbon atoms, more preferably 1 to 16 carbon atoms, and still more preferably 1 to 12 carbon atoms; for example, diethylphosphoric amide or phenylphosphoric amide), a hydroxy group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (having preferably 1 to 30 carbon atoms, and more preferably 1 to 12 carbon atoms and having a heteroatom such as a nitrogen atom, an oxygen atom, or a sulfur atom; for example, imidazolyl, pyridyl, quinolyl, furyl, thienyl, piperidyl, morpholino, benzoxazolyl, benzimidazolyl, benzthiazolyl, carbazolyl, or azepinyl), and a silyl group (having preferably 3 to 40 carbon atoms, more preferably 3 to 30 carbon atoms, and still more preferably 3 to 24 carbon atoms; for example, trimethylsilyl or triphenylsilyl). These substituents may be further substituted. In addition, in a case where two or more substituents are present, the substituents may be the same as or different from each other. In addition, if possible, the substituents may be linked to each other to form a ring. In addition, a plurality of betaine structures may be included through R or L.

$M_1$ represents a hydrogen atom or a monovalent counter cation.

In a case where $M_1$ represents a counter ion of an ammonium ion including the N atom in the formula, this counter ion does not exist as a cation.

The monovalent counter cation is an alkali metal cation (for example, a sodium ion, a potassium ion, a lithium ion, or a cesium ion), an ammonium ion, an organic amine cation (in the case of primary to tertiary amines, the monovalent counter cation is a protonated organic amine, for example, protonated methylamine, dimethylamine, ethylamine, diethylamine, triethylamine, diazabicycloundecene, diazabicyclooctane, piperidine, pyrrolidine, morpholine, N-methylpiperidine, N-methylmorpholine, pyridine, pyrazine, aniline, or N,N-dimethylaniline; and in the case of a quaternary ammonium salt, the monovalent counter cation is a tetramethylammonium ion, a tetraethylammonium ion, a trimethylbenzylammonium ion, a methylpyridinium ion, or a benzylpyridinium ion).

It is preferable that $M_1$ represents an alkali metal ion or a hydrogen atom.

q represents an integer of 1 or more (preferably 5 or less, and more preferably 2 or less), and r represents an integer of 1 to 4 (preferably 1 or 2). p represents an integer of 0 to 3 (preferably 1 or 2), and p+r represents 3 or 4. In a case where p+r represents 4, the N atom is a quaternary ammonium cation, and one of $COOM_1$'s represents a dissociated anion. In a case where q represents 2 or more, $COOM_1$'s may be the same as or different from each other. In a case where r represents 2 or more, $L\text{-}(COOM_1)_q$'s may be the same as or different from each other. In a case where p represents 2 or more, R's may be the same as or different from each other.

Among the compounds represented by Formula (W-1), a compound represented by the following Formula (W-2) or (W-3) is preferably used as the betaine compound used in the present invention.

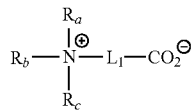  Formula (W-2)

Ra, Rb and Rc in Formula (W-2) have the same definition and the same preferable range as R in Formula (W-1). $L_1$ represents a divalent linking group and is the same as L in Formula (W-1) which represents a divalent linking group.

In the betaine compound represented by Formula (W-2), it is preferable that at least one of Ra, Rb, Rc, or L includes a group having 8 or more carbon atoms. In particular, it is preferable that at least one of Ra, Rb, or Rc includes a long-chain alkyl group having 8 or more carbon atoms.

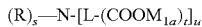  Formula (W-3)

In the formula, R, L, and q have the same definitions and the same preferable ranges as R, L, and q in Formula (W-1). $M_{1a}$ represents an alkali metal ion or a hydrogen atom. u represents an integer of 1 to 3. s represents an integer of 0 to 2. s+u represents 3. In a case where s represents 2, R's may be the same as or different from each other. In a case where q represents 2 or more, $COOM_{1a}$'s may be the same as or different from each other. In a case where u represents 2 or more, $L\text{-}(COOM_{1a})_t$'s may be the same as or different from each other.

In Formula (W-3), $M_{1a}$ represents an alkali metal ion or a hydrogen atom.

In a case where $M_{1a}$ represents an alkali metal ion, examples of the alkali metal ion include a sodium ion, a potassium ion, a lithium ion, and a cesium ion.

u represents an integer of 1 to 3 (preferably 1 or 2). s represents an integer of 0 to 2 (preferably 1 or 2), and s+u represents 3.

Further, it is preferable that R or L includes a hydrocarbon group having 8 or more carbon atoms.

It is most preferable that the compound represented by Formula (W-1) or (W-3) is a compound represented by the following Formula (W-4).

  Formula (W-4)

R, L, and $M_1$ have the same definitions as R, L, and $M_1$ in Formula (W-1). Two $(L\text{-}COOM_1)$'s may be the same as or different from each other (two L's and two $M_1$'s may be the same as or different from each other). R represents preferably an alkyl group, and L represents preferably an alkylene group.

In particular, it is preferable that R includes a long-chain alkyl group having 8 or more carbon atoms.

It is more preferable that R includes a long-chain alkyl group having 12 or more carbon atoms, and it is most preferable that R includes a long-chain alkyl group having 14 to 18 more carbon atoms.

Hereinafter, specific examples of the betaine compound will be shown, but the present invention is not limited thereto. In structural formulae of the following specific compounds, (n) represents that the portion is linear.

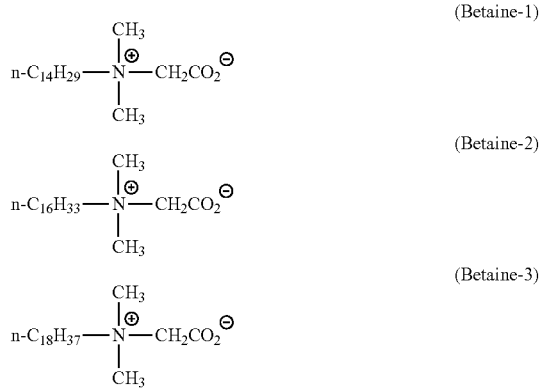

Specific examples of the betaine compound other than the above examples include specific exemplary compounds described in paragraphs "0033" to "0043" of JP2005-298744A.

The content of the betaine compound is preferably 0.1 to 10 mass % and more preferably 1 to 6 mass % with respect to the total mass of the aqueous solution according to the embodiment of the present invention.

By adjusting the content to be 0.1 mass % or higher, the image quality and storage stability of a printed material obtained using the aqueous solution as an ink jet recording ink are improved. By adjusting the content to be 10 mass % or lower, the steps of manufacturing the aqueous solution according to the embodiment of the present invention is stabilized.

In a case where two or more betaine compounds are used in combination, a compound having the maximum amount is preferably 1 to 10000 times that of a compound having the minimum amount by mass ratio.

<Other Components>

Optionally, the aqueous solution according to the embodiment of the present invention may include components other than the above-described components. Examples of the other components include glycerin, 2-pyrrolidone, 1,5-pentanediol, and 1,6-hexanediol.

In a case where the aqueous solution according to the embodiment of the present invention includes the other components, the content of the other components is preferably 1 to 10 mass % with respect to the total mass of the aqueous solution.

[Coloring Composition]

The coloring composition according to the embodiment of the present invention is a coloring composition formed of the aqueous solution. That is, the coloring composition according to the embodiment of the present invention is prepared using the aqueous solution and includes the aqueous solution. In addition, the aqueous solution itself may be used as the coloring composition.

The coloring composition according to the embodiment of the present invention may further include a medium and, in a case where a solvent is used as the medium, is suitable as an ink jet recording ink. Examples of the medium include a lipophilic medium and an aqueous medium. Among these, an aqueous medium is preferably used.

The content of the compound represented by Formula (1) in the coloring composition is determined based on, for example, the kind of the compound represented by Formula (1), and the kind of the solvent component used for manufacturing the coloring composition. The content of the compound represented by Formula (1) in the coloring composition is preferably 0.1 to 20 mass %, more preferably 0.2 to 20 mass %, still more preferably 1 to 20 mass %, still more preferably 1 to 10 mass %, and most preferably 2 to 6 mass % with respect to the total mass of the coloring composition.

By adjusting the content of the compound represented by Formula (1) in the coloring composition to be 1 mass % or higher, the printing density of ink on a recording medium during printing can be improved. In addition, by adjusting the total content of the compound represented by Formula (1) in the coloring composition to be 10 mass % or lower, in a case where the coloring composition is used in an ink jet recording method, the jettability is excellent, and an effect of preventing the clogging or the like of an ink jet nozzle can be obtained.

The coloring composition according to the embodiment of the present invention optionally includes other additives within a range where the effects of the present invention are exhibited.

The coloring composition according to the embodiment of the present invention can be preferably used as an ink jet recording ink.

[Ink Jet Recording Ink]

The ink jet recording ink according to the embodiment of the present invention is prepared using the aqueous solution according to the embodiment of the present invention or the coloring composition according to the embodiment of the present invention. That is, the ink jet recording ink according to the embodiment of the present invention is prepared using the aqueous solution or the coloring composition and includes the aqueous solution or the coloring composition. In addition, the aqueous solution or the coloring composition may be used as the ink jet recording ink. In the ink jet recording ink, an aqueous medium is preferably used.

The ink jet recording ink according to the embodiment of the present invention optionally includes other additives within a range where the effects of the present invention are exhibited. Examples of the other additives include well-known additives such as an anti-drying agent (wetting agent), an antifading agent, an emulsion stabilizer, a penetration enhancer, a ultraviolet absorber, a preservative, a fungicide, a pH adjuster, a surface tension adjuster, an antifoaming agent, a viscosity adjuster, a dispersant, a dispersion stabilizer, a rust inhibitor, a chelating agent, or a betaine compound. In the case of a water-soluble ink, these various additives can be directly added to the ink solution.

As the aqueous medium, a mixture including water as a major component and to which a water-miscible organic solvent is optionally added can be used. Examples of the water-miscible organic solvent include an alcohol (for example, methanol, ethanol, propanol, isopropanol, butanol, isobutanol, sec-butanol, t-butanol, pentanol, hexanol, cyclohexanol, or benzyl alcohol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, or thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, or ethylene glycol monophenyl ether), an amine (for example, ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethyleneimine, or tetramethyl propylene diamine), and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, or acetone). As the water-miscible organic solvent, two or more kinds may be used in combination.

The aqueous solution according to the embodiment of the present invention includes the preservative. In order to prepare the ink jet recording ink by addition of the aqueous medium or the like, the preservative may be additionally added. The addition amount of the preservative to the ink jet recording ink is the same as the addition amount of the preservative to the aqueous solution.

In the present invention, it is preferable that the total mass of inorganic ions incorporated into the ink is reduced to be 2 mass % or lower with respect to the total weight of the ink.

The inorganic ions described herein refers to all the inorganic ions including an inorganic ion of a counter ion of a dye, an inorganic ion derived from an inorganic salt which is an impurity included in the betaine surfactant, an inorganic ion which becomes a counter ion of an ionic component excluded from the ion equivalent of the betaine compound, an inorganic ion which is introduced from an inorganic salt used for pH adjustment, and an inorganic ion which is introduced from an ink additive such as a chelating agent or a preservative. In the present invention, an ammonium ion is considered as a volatile compound and is excluded from the inorganic ions.

The total mass of the inorganic ions is preferably 2 mass % or lower, more preferably 1 mass % or lower, and still more preferably 0.5 mass % or lower with respect to the total weight of the ink.

In order to reduce the content of the inorganic ions in the ink to be as low as possible, various methods can be used.

For example, a method described in JP2004-285269A can be performed.

Firstly, a method of removing inorganic ions included in the materials (for example, the betaine compound) used for the ink during the synthesis of the materials can be adopted. In many cases, a water-soluble ink material includes many ionic-dissociable groups in order to improve particularly water solubility. At this time, a large amount of inorganic materials may be introduced during the synthesis of the material, and inorganic ions may be unavoidably introduced as counter ions. In order to remove the ions of the former case, for example, a desalting purification method by electrodialysis using an ion selective permeable membrane, a method using an ion exchange resin, or a desalting purification method by gel filtration can be performed.

In addition, a method of actively exchanging ions during the synthesis can be used. For example, a method of adding an excess amount of ammonia or organic amine and exchanging it with a metal ion or, in the case of an anion, a method of exchanging an organic carboxylic acid with the anion can be used. In addition, as the desalting method during the synthesis, a method of actively precipitating a salt in an organic solvent and removing the salt by filtration can be used.

Secondly, it is also preferable that the desalting purification is performed in the form of ink raw materials, that is, in the form of the aqueous solution in which various materials are dissolved in a solvent such as water. In some cases, the desalting purification can also be performed on a complete ink product.

The viscosity of the ink jet recording ink according to the embodiment of the present invention is preferably 30 mPa·s or lower. In addition, the surface tension of the ink jet recording ink according to the embodiment of the present invention is preferably 25 mN/m to 70 mN/m. The viscosity and the surface tension can be adjusted by adding various additives such as a viscosity adjuster, a surface tension adjuster, a specific resistance adjuster, a film conditioner, an ultraviolet absorber, an antioxidant, an antifading agent, a fungicide, a rust inhibitor, a dispersant, and a surfactant.

The ink jet recording ink according to the embodiment of the present invention can be used as any one of various color inks but is preferably used as a magenta ink. In addition, the ink jet recording ink according to the embodiment of the present invention can be used not only for forming a monochromic image but also for forming a full color image. In order to form a full color image, a magenta ink, a cyan ink, and a yellow ink can be used. In addition, in order to adjust the tone, a black ink may be further used.

The ink jet recording ink according to the embodiment of the present invention can be used in a recording method such as printing, duplicating, marking, writing, drawing, or stamping and is particularly suitable in an ink jet recording method.

[Ink Jet Recording Method]

In the ink jet recording method according to the embodiment of the present invention, energy is applied to the ink jet recording ink according to the embodiment of the present invention to form an image on a well-known image receiving material, that is, plain paper or resin coated paper, for example, ink jet paper, films, electrophotographic common paper, fabric, glass, metal, or ceramic described in JP1996-169172A (JP-H8-169172A), JP1996-027693A (JP-H8-027693A), JP1990-276670A (JP-H2-276670A), JP1995-276789A (JP-H7-276789A), JP1997-323475A (JP-H9-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), JP1998-217597A (JP-H10-217597A), and JP1998-337947A (JP-H10-337947A).

During the formation of an image, in order to impart glossiness or water fastness or to improve weather fastness, a polymer particle dispersion (also referred to as a polymer latex) may also be used. Regarding the timing when the polymer latex is added to the image receiving material, the addition may be performed before, during, or after the addition of the colorants. Therefore, a position where the addition is performed may be the image receiving paper or the ink. Alternatively, a liquid material consisting only of the polymer latex may be used. Specifically, a method described in, for example, JP2000-363090, JP2000-315231, JP2000-354380, JP2000-343944, JP2000-268952, JP2000-299465, and JP2000-297365, can be preferably used.

[Ink Jet Printer Cartridge and Ink Jet Recorded Material]

An ink cartridge for ink jet recording according to the embodiment of the present invention is filled with the above-described ink jet recording ink according to the embodiment of the present invention. In addition, an ink jet recorded material is obtained by forming a colored image on a recording material using the ink jet recording ink according to the embodiment of the present invention.

The ink jet recording ink according to the embodiment of the present invention can be used in well-known ink jet recording methods without any particular limitation, for example, a charge control method of jetting ink using an electrostatic attraction force, a drop-on-demand method (pressure pulse method) using a vibration pressure of a piezoelectric element, an acoustic ink jet method of jetting ink using a radiation pressure by converting an electrical signal into an acoustic beam and irradiating the ink with the acoustic beam, or a thermal ink jet method of heating ink to form bubbles and using a pressure generated from the bubbles. Examples of the ink jet recording method include a method of jetting a plurality of droplets of a low-density ink called photo ink with a small volume, a method of improving image quality using a plurality of inks having substantially the same color and different densities, and a method of using a colorless transparent ink.

EXAMPLES

Hereinafter, the present invention will be described using examples, but the present invention is not limited to these examples. Unless specified otherwise, "%" and "part(s)" represent "mass %" and "part(s) by mass".

(Synthesis Example of Dye)

(Synthesis of Exemplary Compound (1-11))

An exemplary compound (1-11) can be synthesized, for example, using the following scheme.

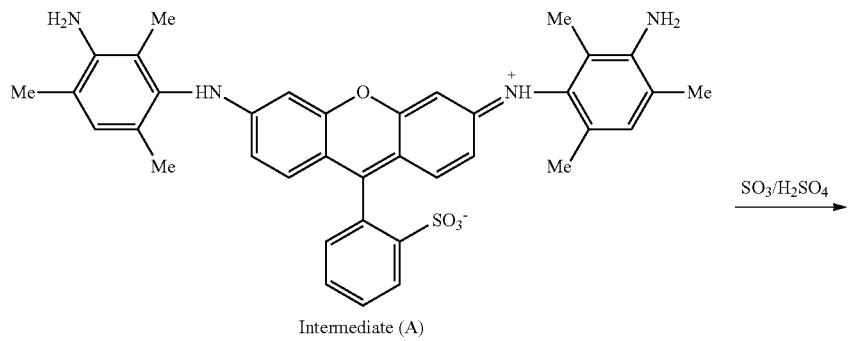

Intermediate (A)

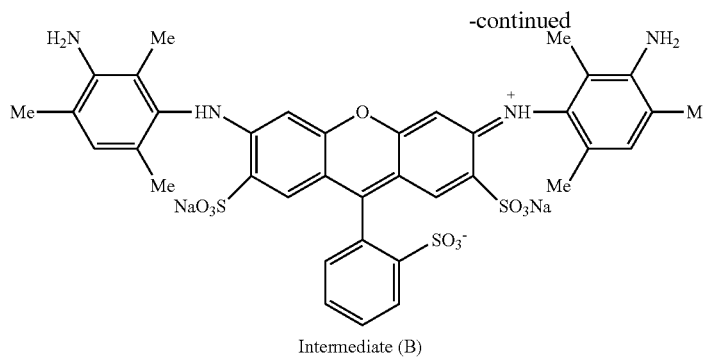
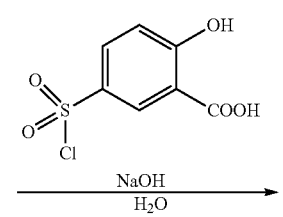

Intermediate (B)

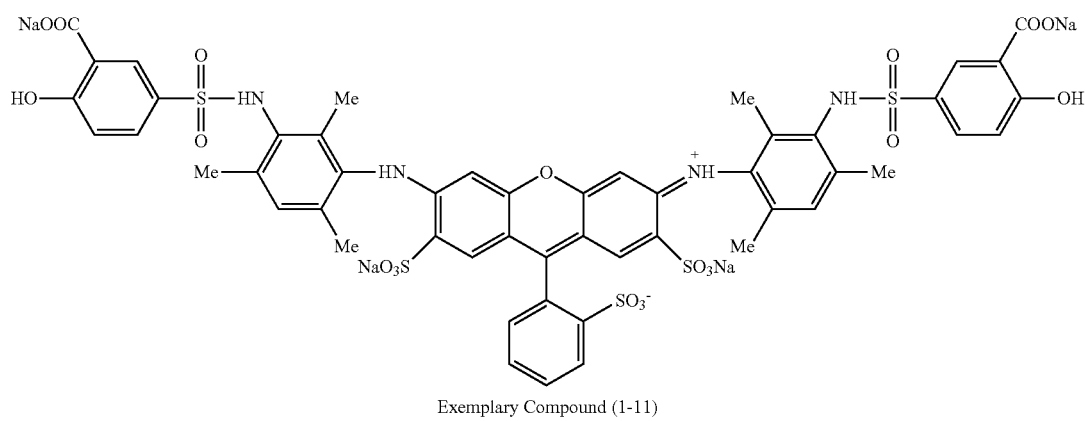

Exemplary Compound (1-11)

(Synthesis of Intermediate (B))

23.0 g of Intermediate Product (A) (which was synthesized using a method described in paragraph "0065", p. 17 of JP2011-148973A) was added to 420 g of 10% fuming sulfuric acid, and a reaction was caused to occur at room temperature for 48 hours. The reaction solution was poured into a large excess of ethyl acetate, and precipitated crystals was separated by filtration. The separated crystals were dissolved in 500 mL of methanol, the solution was adjusted to pH 7 using a 28% sodium methoxide methanol solution, and precipitated sodium sulfate was removed by filtration. Next, the filtrate was condensed using a rotary evaporator. The obtained residue was purified by column chromatography (filler: SEPHADEX LH-20 (manufactured by Pharmacia), developing solvent: methanol) to obtain crystals of an intermediate (B).

Yield amount: 21.0 g
Yield: 68%
Mass spectrum (MS) (m/z)=793 ([M-2Na+H]$^-$, 100%)

(Synthesis of Exemplary Compound (1-11))

3.0 g of the intermediate (B) was dissolved in 15 mL of ultrapure water, and the reaction solution was cooled to an internal temperature of 10° C. or lower. 2.55 g of powder of 5-(chlorosulfonyl)salicylic acid (synthesized using a method described in German Patent No. DE264786) was added, 10% NaOH aqueous solution was added dropwise at an internal temperature of 10° C. or lower such that the pH of the reaction solution was maintained at 8.0, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-11) were obtained.

Yield amount: 1.5 g
Yield: 33%
MS (m/z)=1191 ([M-1]$^-$, 100%)

In an absorption spectrum of the exemplary compound (1-11) in the dilute aqueous solution, the absorption maximum was 532 nm, and the molar absorption coefficient was 87000. FIG. 1 is a diagram showing a $^1$H-NMR spectrum of the exemplary compound (1-11) in dimethyl sulfoxide-d6.

(Synthesis of Exemplary Compound (1-30))

An exemplary compound (1-30) can be synthesized, for example, using the following scheme.

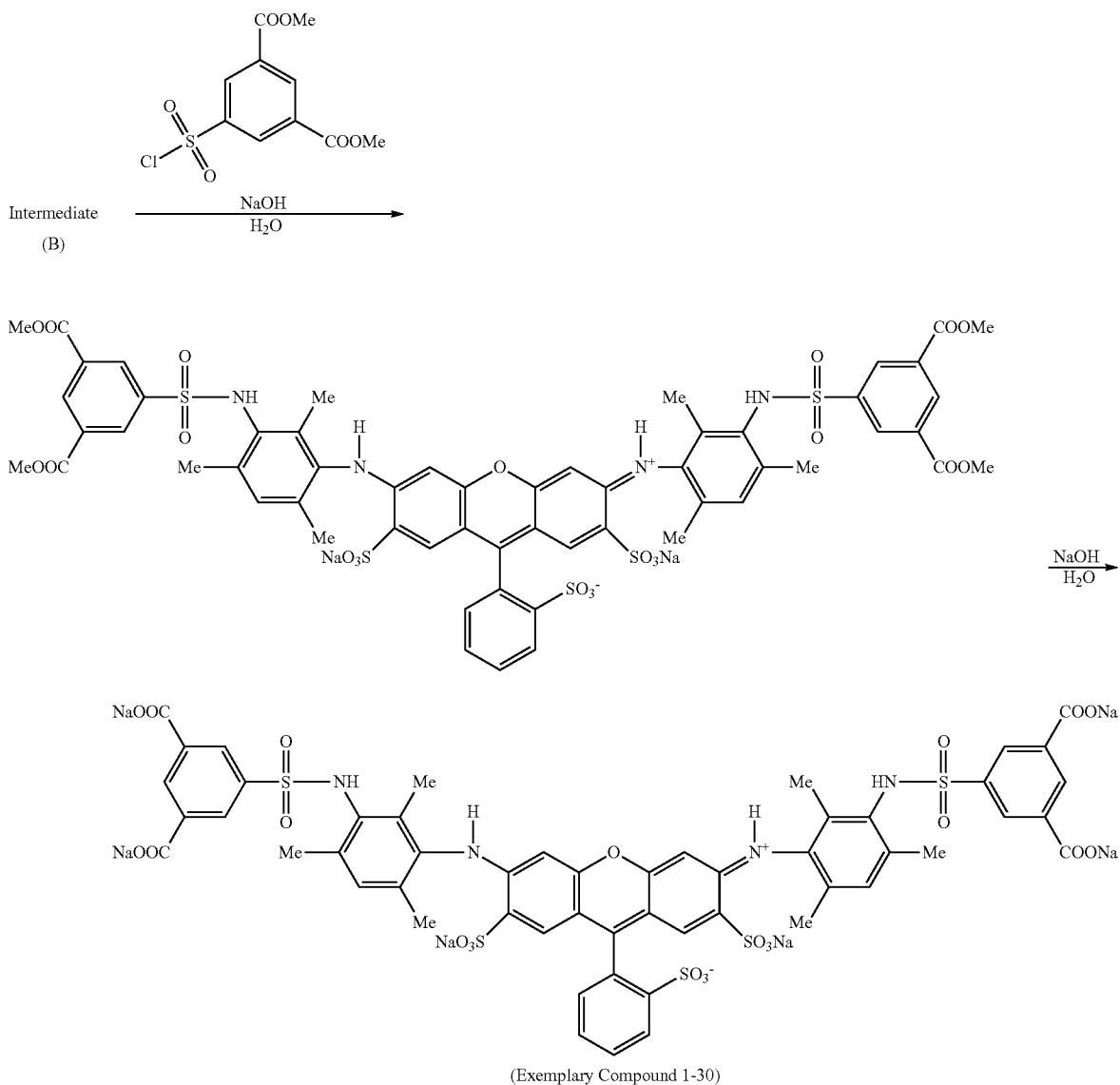

(Exemplary Compound 1-30)

3.0 g of the intermediate (B) obtained as the synthetic intermediate of the exemplary compound (1-11) described above was dissolved in 15 mL of ultrapure water. 2.2 g of powder of dimethyl 5-chlorosulfonyl-terephthalate (synthesized using a method described in German Patent No. DE278091) was added, 10% NaOH aqueous solution was added dropwise such that the pH of the reaction solution was maintained at 5 to 7, and the dropwise addition was continued until the pH did not change. After completion of the reaction, 3 mL of 50% NaOH aqueous solution was added and stirred for 1 hour. The obtained reaction solution was poured into a large excess of ethanol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-30) were obtained.

Yield amount: 3.7 g

Yield: 70%

MS (m/z)=1247 ([M-1]$^-$, 100%)

Figure 4:
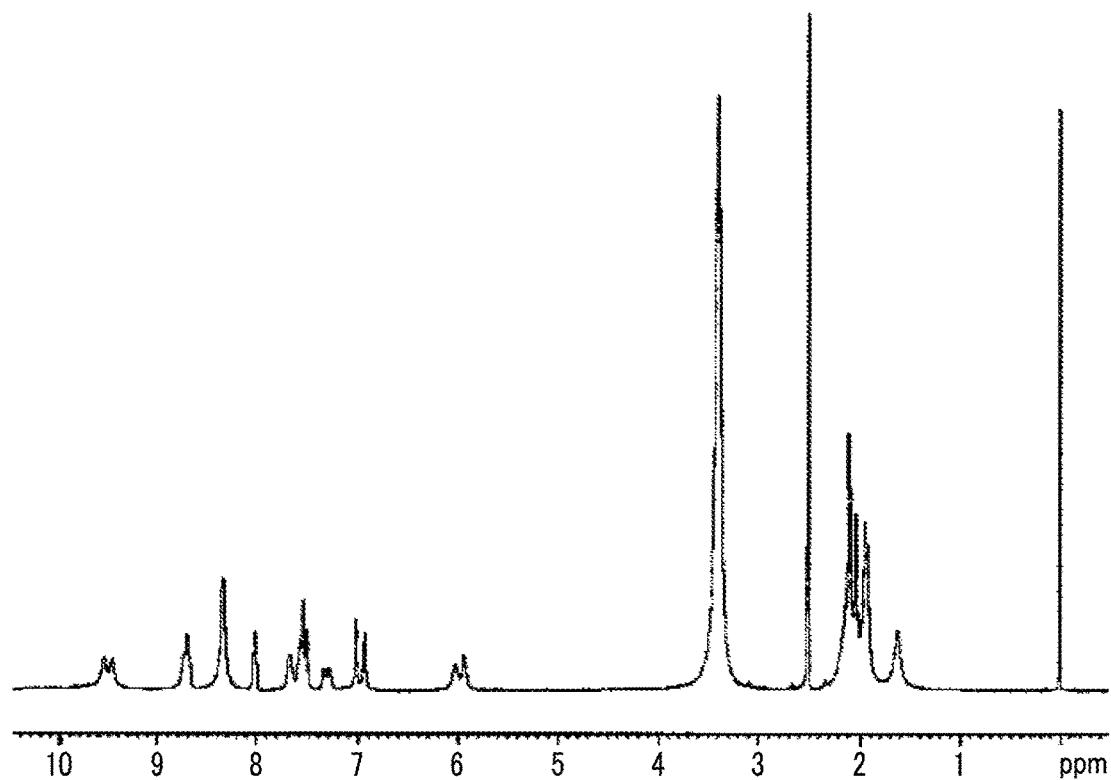
FIG. 4 is a diagram showing a $^1$H-NMR spectrum of an exemplary compound (1-30) in dimethyl sulfoxide-d6.

In an absorption spectrum of Exemplary Compound (1-30) in the dilute aqueous solution, the absorption maximum was 532 nm, and the molar absorption coefficient was 82000. FIG. 4 is a diagram showing a $^1$H-NMR spectrum of the exemplary compound (1-30) in dimethyl sulfoxide-d6.

(Synthesis of Exemplary Compound (1-18))

An exemplary compound (1-18) can be synthesized, for example, using the following scheme.

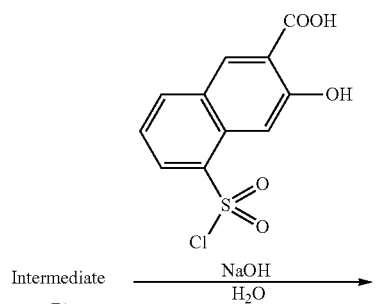

Intermediate (B)

NaOH / H₂O →

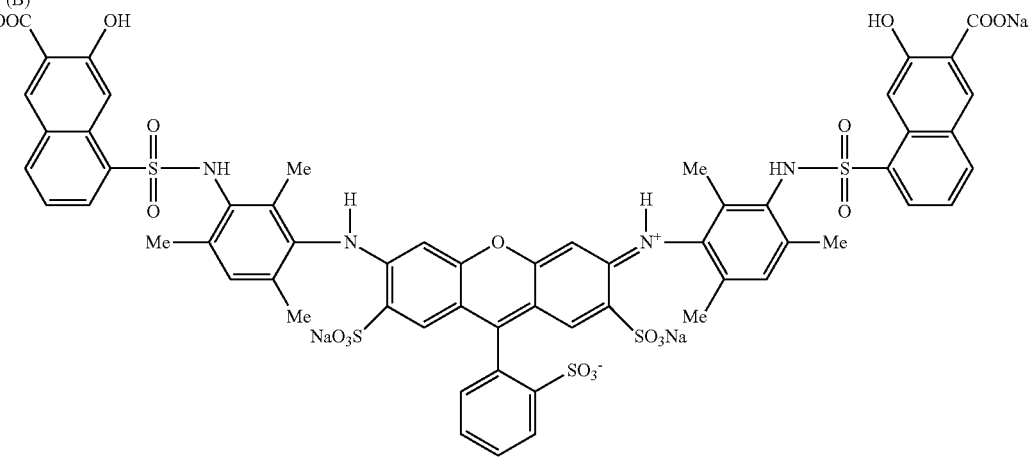

Exemplary Compound (1-18)

3.0 g of the intermediate (B) obtained as the synthetic intermediate of the exemplary compound (1-11) described above was dissolved in 15 mL of ultrapure water, and the obtained solution was cooled to an internal temperature of 10° C. or lower. 2.2 g of powder of 5-chlorosulfonyl-3-hydroxy-2-naphthoic acid (synthesized using a method described in German Patent No. DE264786) was added. 10% NaOH aqueous solution was added dropwise at an internal temperature of 10° C. or lower such that the pH of the reaction solution was maintained at 7.5, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-18) were obtained.

Yield amount: 1.2 g
Yield: 24%
MS (m/z)=1291 ([M-1]⁻, 100%)

Figure 2:
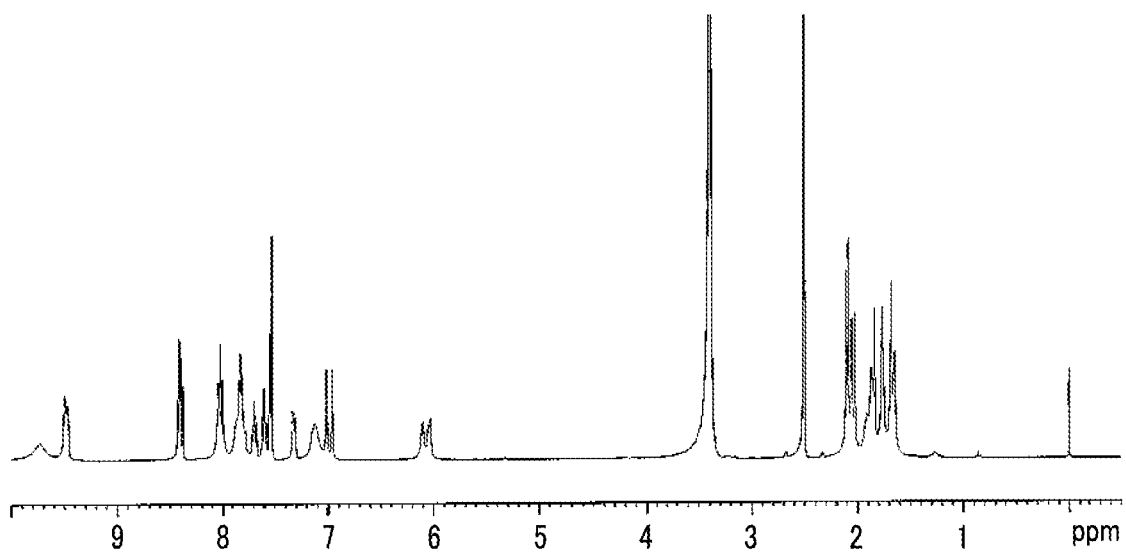
FIG. 2 is a diagram showing a $^1$H-NMR spectrum of an exemplary compound (1-18) in dimethyl sulfoxide-d6.

In an absorption spectrum of the exemplary compound (1-18) in the dilute aqueous solution, the absorption maximum was 532 nm, and the molar absorption coefficient was 85000. FIG. 2 is a diagram showing a ¹H-NMR spectrum of the exemplary compound (1-18) in dimethyl sulfoxide-d6.

(Synthesis of Exemplary Compound (1-25))

An exemplary compound (1-25) can be synthesized, for example, using the following scheme.

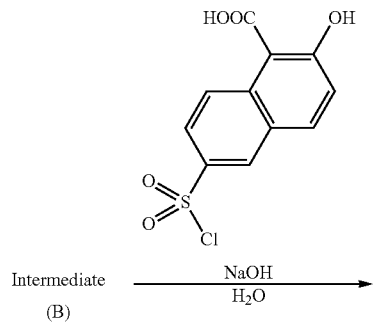

Intermediate (B)

NaOH / H₂O →

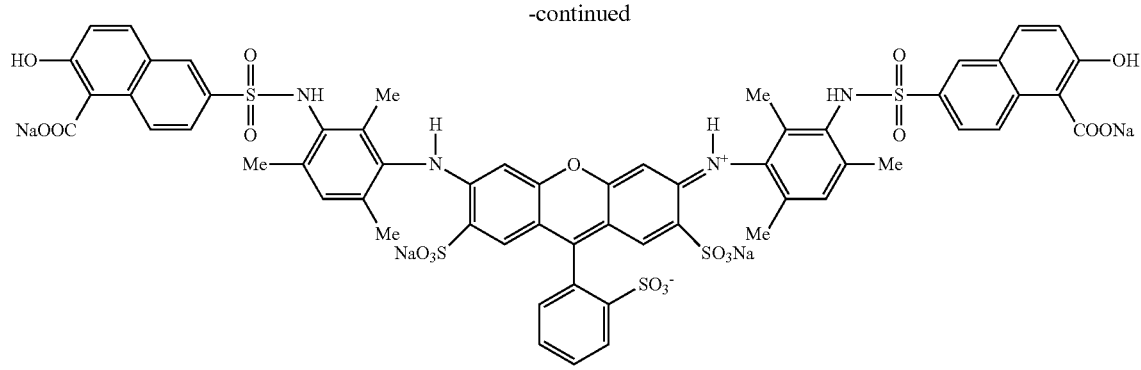

Exemplary Compound (1-25)

3.0 g of the intermediate (B) obtained as the synthetic intermediate of the exemplary compound (1-11) described above was dissolved in 15 mL of ultrapure water, and the obtained solution was cooled to an internal temperature of 10° C. or lower. 2.2 g of powder of 6-chlorosulfonyl-2-hydroxy-1-naphthoic acid (synthesized using a method described in German Patent No. DE278091) was added, 10% NaOH aqueous solution was added dropwise at an internal temperature of 10° C. or lower such that the pH of the reaction solution was maintained at 7.5, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum, Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-25) were obtained.

Yield amount: 1.3 g
Yield: 26%
MS (m/z)=1291 ([M-1]$^-$, 100%)

In an absorption spectrum of Exemplary Compound (1-25) in the dilute aqueous solution, the absorption maximum was 532 nm, and the molar absorption coefficient was 83000.

(Synthesis of Exemplary Compound (1-26))

An exemplary compound (1-26) can be synthesized, for example, using the following scheme.

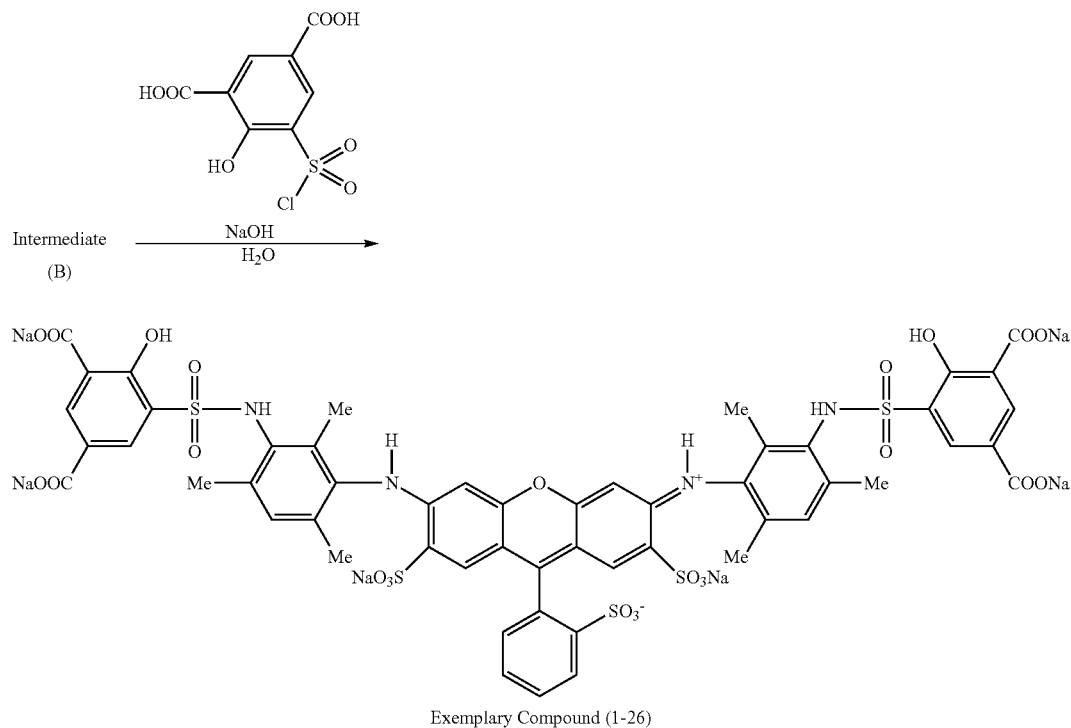

Exemplary Compound (1-26)

3.0 g of the intermediate (B) obtained as the synthetic intermediate of the exemplary compound (1-11) described above was dissolved in 15 mL of ultrapure water, and the obtained solution was cooled to an internal temperature of 10° C. or lower. 2.7 g of powder of 5-chlorosulfonyl-4-hydroxyisophthalic acid (synthesized using a method described in German Patent No. DE264786) was added, 10% NaOH aqueous solution was added dropwise at an internal temperature of 10° C. or lower such that the pH of the reaction solution was maintained at 7.5, and the dropwise addition was continued until the pH did not change. The obtained reaction solution was poured into a large excess of isopropyl alcohol, and precipitated solid was separated by filtration. The obtained solid was dissolved in 20 mL of a mixed solvent (water/methanol=1/1). Next, the obtained solution was purified by column chromatography (filler: SEPHADEX LH-20 (manufactured by Pharmacia), developing solvent: water/methanol). Next, an inorganic salt and a residual organic solvent were removed using a dialysis membrane (molecular weight cutoff: 3500, Spectra/Por 3 Dialysis Membrane (trade name, manufactured by Spectrum. Inc.)). The pH of the obtained aqueous solution was adjusted to 7 using a diluted sodium hydroxide aqueous solution, and dust was removed by filtration using a membrane filter. The obtained aqueous solution was condensed and dried using a rotary evaporator. As a result, green glossy crystals of the exemplary compound (1-26) were obtained.

Yield amount: 1.8 g
Yield: 36%
MS (m/z)=1279 ([M-1]$^-$, 100%)

Figure 3:
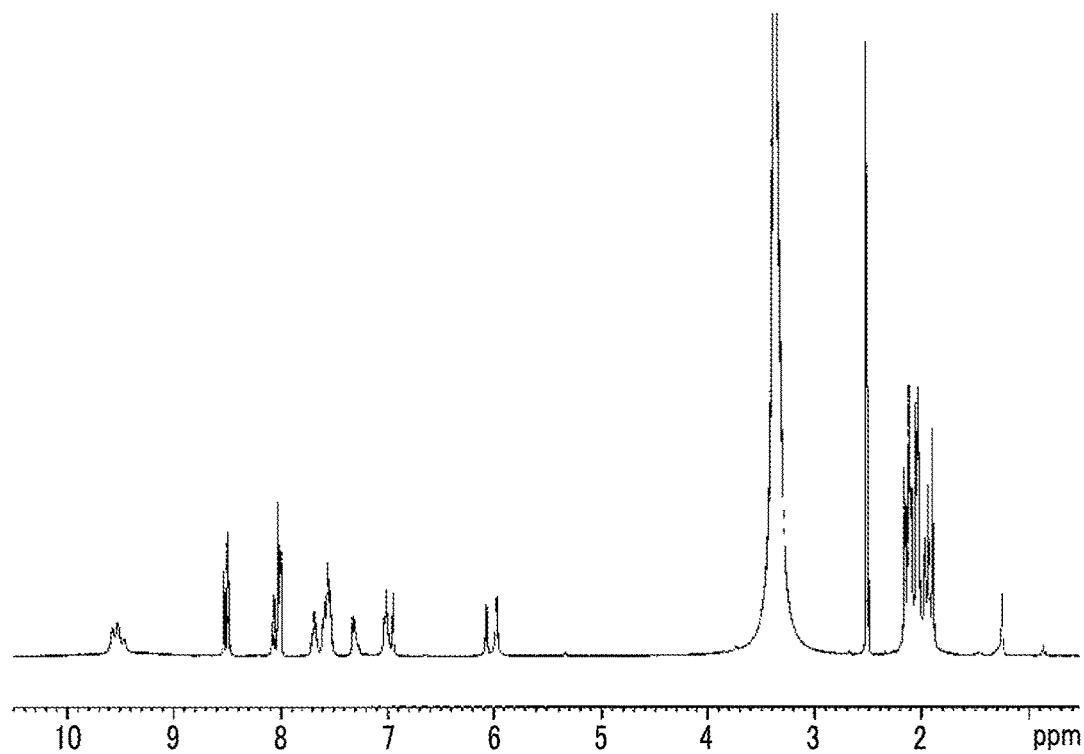
FIG. 3 is a diagram showing a $^1$H-NMR spectrum of an exemplary compound (1-26) in dimethyl sulfoxide-d6.

In an absorption spectrum of Exemplary Compound (1-26) in the dilute aqueous solution, the absorption maximum was 534 nm, and the molar absorption coefficient was 95000. FIG. 3 is a diagram showing a $^1$H-NMR spectrum of the exemplary compound (1-26) in dimethyl sulfoxide-d6.

Other dyes can be synthesized using the above-described method.

Example 1

(Preparation of Aqueous Solution 1)

Deionized water was added to the following components such that the balance was 100 g, and the components were stirred for 1 hour while heating them at 30° C. to 40° C. Next, the solution was cooled to 25° C., the pH of the solution was adjusted to 8.5 using 10 mol/L of sodium hydroxide aqueous solution, and the obtained solution was filtered under reduced pressure through a microfilter having an average pore size of 0.2 μm. As a result, an aqueous solution 1 was prepared.

Composition of Aqueous Solution 1:

| | |
|---|---|
| Dye (exemplary compound (1-11)) | 10.00 g |
| PROXEL XL II (preservative, manufactured by Avecia) | 0.2 g |
| Betaine-1 | 5.7 g |

(Preparation of Ink Jet Recording Ink 1)

A hydrophilic organic solvent, water, or the like was added to the aqueous solution 1, and the aqueous solution 1 was diluted with deionized water such that the amount of the exemplary compound (1-11) as a dye was 3.5 mass %. As a result, an ink jet recording ink 1 was prepared.

Composition of Ink Jet Recording Ink 1:

| | |
|---|---|
| Dye (exemplary compound (1-11)) | 3.50 g |
| PROXEL XL II (preservative, manufactured by Avecia) | 0.11 g |
| Betaine-1 (betaine compound having the following structure) | 2.00 g |
| Diethylene glycol | 10.65 g |
| Glycerin1 | 4.70 g |
| Diethylene glycol monobutyl ether | 12.70 g |
| Triethanolamine | 0.65 g |
| OLFINE E1010 (manufactured by Nissin Chemical Co., Ltd.) | 0.90 g |
| Deionized water | 54.79 g |

Example 2

An aqueous solution 2 and an ink jet recording ink 2 were prepared through the same operation as in Example 1, except that the exemplary compound (1-18) was used instead of the exemplary compound (1-11).

Example 3

An aqueous solution 3 and an ink jet recording ink 3 were prepared through the same operation as in Example 1, except that the exemplary compound (1-19) was used instead of the exemplary compound (1-11).

Example 4

An aqueous solution 4 and an ink jet recording ink 4 were prepared through the same operation as in Example 1, except that the exemplary compound (1-20) was used instead of the exemplary compound (1-11).

Example 5

An aqueous solution 5 and an ink jet recording ink 5 were prepared through the same operation as in Example 1, except that the exemplary compound (1-25) was used instead of the exemplary compound (1-11).

Example 6

An aqueous solution 6 and an ink jet recording ink 6 were prepared through the same operation as in Example 1, except that the exemplary compound (1-26) was used instead of the exemplary compound (1-11).

Example 7

An aqueous solution 7 and an ink jet recording ink 7 were prepared through the same operation as in Example 1, except that the exemplary compound (1-29) was used instead of the exemplary compound (1-11).

Example 8

An aqueous solution 8 and an ink jet recording ink 8 were prepared through the same operation as in Example 1, except that the exemplary compound (1-30) was used instead of the exemplary compound (1-11).

Example 9

An aqueous solution 9 and an ink jet recording ink 9 were prepared through the same operation as in Example 1, except that the exemplary compound (1-34) was used instead of the exemplary compound (1-11).

Example 10

An aqueous solution 10 and an ink jet recording ink 10 were prepared through the same operation as in Example 1, except that the exemplary compound (1-35) was used instead of the exemplary compound (1-11).

Example 11

An aqueous solution 11 and an ink jet recording ink 11 were prepared through the same operation as in Example 6, except that the amount of PROXEL XL II used for preparing the aqueous solution was changed from 0.2 g to 0.1 g.

Example 12

An aqueous solution 12 and an ink jet recording ink 12 were prepared through the same operation as in Example 6, except that the amount of PROXEL XL II used for preparing the aqueous solution was changed from 0.2 g to 0.3 g.

Example 13

An aqueous solution 13 and an ink jet recording ink 13 were prepared through the same operation as in Example 6, except that the amount of PROXEL XL II used for preparing the aqueous solution was changed from 0.2 g to 0.4 g.

Example 14

An aqueous solution 14 and an ink jet recording ink 14 were prepared through the same operation as in Example 7, except that the amount of PROXEL XL II used for preparing the aqueous solution was changed from 0.2 g to 0.1 g.

Example 15

An aqueous solution 15 and an ink jet recording ink 15 were prepared through the same operation as in Example 7, except that the amount of PROXEL XL II used for preparing the aqueous solution was changed from 0.2 g to 0.3 g.

Example 16

An aqueous solution 16 and an ink jet recording ink 16 were prepared through the same operation as in Example 7, except that the amount of PROXEL XL II used for preparing the aqueous solution was changed from 0.2 g to 0.4 g.

Example 17

An aqueous solution 17 and an ink jet recording ink 17 were prepared through the same operation as in Example 8, except that the amount of PROXEL XL II used for preparing the aqueous solution was changed from 0.2 g to 0.1 g.

Example 18

An aqueous solution 18 and an ink jet recording ink 18 were prepared through the same operation as in Example 8, except that the amount of PROXEL XL II used for preparing the aqueous solution was changed from 0.2 g to 0.3 g.

Example 19

An aqueous solution 19 and an ink jet recording ink 19 were prepared through the same operation as in Example 8, except that the amount of PROXEL XL II used for preparing the aqueous solution was changed from 0.2 g to 0.4 g.

Example 20

An aqueous solution 20 and an ink jet recording ink 20 were prepared through the same operation as in Example 9, except that the amount of PROXEL XL II used for preparing the aqueous solution was changed from 0.2 g to 0.1 g.

Example 21

An aqueous solution 21 and an ink jet recording ink 21 were prepared through the same operation as in Example 9, except that the amount of PROXEL XL II used for preparing the aqueous solution was changed from 0.2 g to 0.3 g.

Example 22

An aqueous solution 22 and an ink jet recording ink 22 were prepared through the same operation as in Example 9, except that the amount of PROXEL XL II used for preparing the aqueous solution was changed from 0.2 g to 0.4 g.

Example 23

An aqueous solution 23 and an ink jet recording ink 23 were prepared through the same operation as in Example 6, except that PROXEL GXL was used instead of PROXEL XL II.

Example 24

An aqueous solution 24 and an ink jet recording ink 24 were prepared through the same operation as in Example 7, except that PROXEL GXL was used instead of PROXEL XL II.

Example 25

An aqueous solution 25 and an ink jet recording ink 25 were prepared through the same operation as in Example 8, except that PROXEL GXL was used instead of PROXEL XL II.

Example 26

An aqueous solution 26 and an ink jet recording ink 26 were prepared through the same operation as in Example 9, except that PROXEL GXL was used instead of PROXEL XL II.

Example 27

An aqueous solution 27 and an ink jet recording ink 27 were prepared through the same operation as in Example 6, except that 0.1 g of PROXEL XL II and 0.1 g of PROXEL GXL were used instead of 0.2 g of PROXEL XL II for preparing the aqueous solution.

Example 28

An aqueous solution 28 and an ink jet recording ink 28 were prepared through the same operation as in Example 7, except that 0.1 g of PROXEL XL II and 0.1 g of PROXEL GXL were used instead of 0.2 g of PROXEL XL II for preparing the aqueous solution.

Example 29

An aqueous solution 29 and an ink jet recording ink 29 were prepared through the same operation as in Example 8, except that 0.1 g of PROXEL XL II and 0.1 g of PROXEL GXL were used instead of 0.2 g of PROXEL XL II for preparing the aqueous solution.

Example 30

An aqueous solution 30 and an ink jet recording ink 30 were prepared through the same operation as in Example 9, except that 0.1 g of PROXEL XL II and 0.1 g of PROXEL GXL were used instead of 0.2 g of PROXEL XL II for preparing the aqueous solution.

Example 31

An aqueous solution 31 and an ink jet recording ink 31 were prepared through the same operation as in Example 6, except that phenoxy ethanol was used instead of PROXEL XL II.

Example 32

An aqueous solution 32 and an ink jet recording ink 32 were prepared through the same operation as in Example 8, except that phenoxy ethanol was used instead of PROXEL XL II.

Example 33

An aqueous solution 33 and an ink jet recording ink 33 were prepared through the same operation as in Example 6, except that pentylene glycol was used instead of PROXEL XL II.

Example 34

An aqueous solution 34 and an ink jet recording ink 34 were prepared through the same operation as in Example 8, except that pentylene glycol was used instead of PROXEL XL II.

Example 35

An aqueous solution 35 and an ink jet recording ink 35 were prepared through the same operation as in Example 6, except that 0.1 g of phenoxy ethanol and 0.1 g of pentylene glycol were used instead of PROXEL XL II for preparing the aqueous solution.

Example 36

An aqueous solution 36 and an ink jet recording ink 36 were prepared through the same operation as in Example 1, except that a betaine 2 was used instead of the betaine compound (betaine 1).

Example 37

An aqueous solution 37 and an ink jet recording ink 37 were prepared through the same operation as in Example 6, except that the betaine 2 was used instead of the betaine compound (betaine 1).

Example 38

An aqueous solution 38 and an ink jet recording ink 38 were prepared through the same operation as in Example 7, except that the betaine 2 was used instead of the betaine compound (betaine 1).

Example 39

An aqueous solution 39 and an ink jet recording ink 39 were prepared through the same operation as in Example 8, except that the betaine 2 was used instead of the betaine compound (betaine 1).

Example 40

An aqueous solution 40 and an ink jet recording ink 40 were prepared through the same operation as in Example 9, except that the betaine 2 was used instead of the betaine compound (betaine 1).

Comparative Example 1

A comparative aqueous solution 1 and a comparative ink jet recording ink 1 were prepared through the same operation as in Example 1, except that PROXEL XL II was not added.

Comparative Example 2

A comparative aqueous solution 2 and a comparative ink jet recording ink 2 were prepared through the same operation as in Example 6, except that PROXEL XL II was not added.

Comparative Example 3

A comparative aqueous solution 3 and a comparative ink jet recording ink 3 were prepared through the same operation as in Example 7, except that PROXEL XL II was not added.

Comparative Example 4

A comparative aqueous solution 4 and a comparative ink jet recording ink 4 were prepared through the same operation as in Example 8, except that PROXEL XL II was not added.

Comparative Example 5

A comparative aqueous solution 5 and a comparative ink jet recording ink 5 were prepared through the same operation as in Example 9, except that PROXEL XL II was not added.

Comparative Example 6

A comparative aqueous solution 6 and a comparative ink jet recording ink 6 were prepared through the same operation as in Example 1, except that a comparative compound (1) was used instead of the exemplary compound (1-11).

Comparative Example 7

A comparative aqueous solution 7 and a comparative ink jet recording ink 7 were prepared through the same operation as in Example 1, except that a comparative compound (2) was used instead of the exemplary compound (1-11).

Comparative Example 8

A comparative aqueous solution 8 and a comparative ink jet recording ink 8 were prepared through the same operation as in Example 1, except that a comparative compound (3) was used instead of the exemplary compound (1-11).

Comparative Example 9

A comparative aqueous solution 9 and a comparative ink jet recording ink 9 were prepared through the same operation as in Example 1, except that a comparative compound (4) was used instead of the exemplary compound (1-11).

Comparative Example 10

A comparative aqueous solution 10 and a comparative ink jet recording ink 10 were prepared through the same operation as in Example 1, except that a comparative compound (5) was used instead of the exemplary compound (1-11).

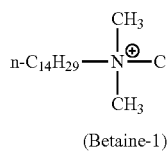 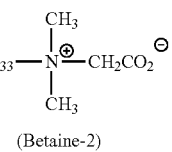

(Betaine-1) (Betaine-2)

(Comparative Compound 1)

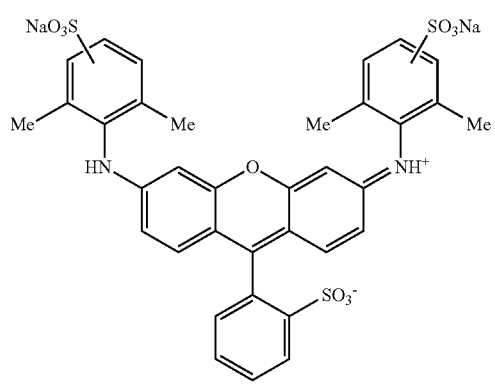

(Comparative Compound 2)

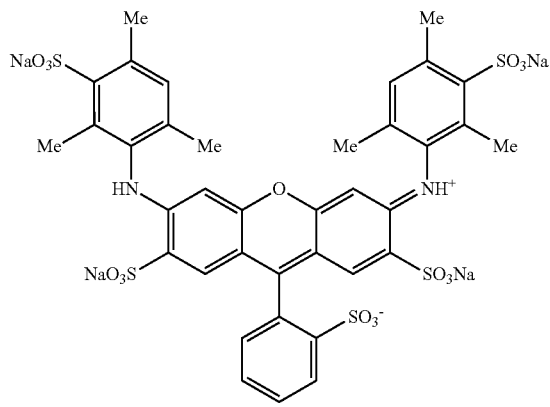

-continued (Comparative Compound 3)

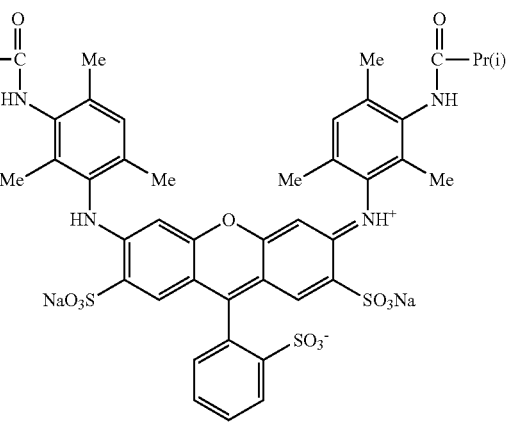

(Comparative Compound 4)

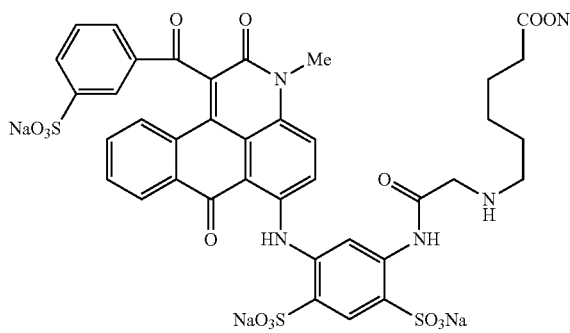

(Comparative Compound 5)

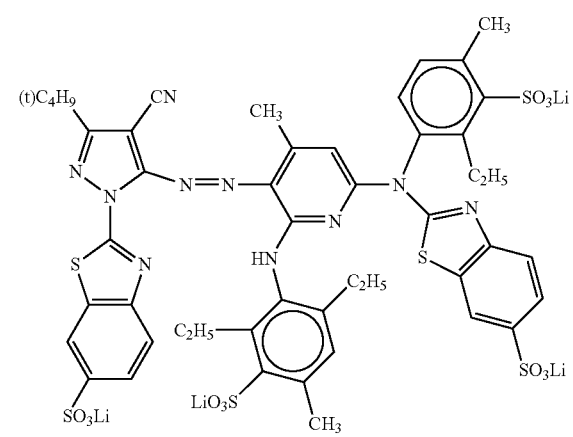

TABLE 1

|  | Aqueous Solution | Ink Jet Recording Ink | Dye | Preservative | Betaine Compound |
|---|---|---|---|---|---|
| Example 1 | Aqueous Solution 1 | Ink 1 | (1-11) | PROXEL XL II | Betaine-1 |
| Example 2 | Aqueous Solution 2 | Ink 2 | (1-18) | PROXEL XL II | Betaine-1 |
| Example 3 | Aqueous Solution 3 | Ink 3 | (1-19) | PROXEL XL II | Betaine-1 |
| Example 4 | Aqueous Solution 4 | Ink 4 | (1-20) | PROXEL XL II | Betaine-1 |
| Example 5 | Aqueous Solution 5 | Ink 5 | (1-25) | PROXEL XL II | Betaine-1 |
| Example 6 | Aqueous Solution 6 | Ink 6 | (1-26) | PROXEL XL II | Betaine-1 |
| Example 7 | Aqueous Solution 7 | Ink 7 | (1-29) | PROXEL XL II | Betaine-1 |

TABLE 1-continued

|  | Aqueous Solution | Ink Jet Recording Ink | Dye | Preservative | Betaine Compound |
|---|---|---|---|---|---|
| Example 8 | Aqueous Solution 8 | Ink 8 | (1-30) | PROXEL XL II | Betaine-1 |
| Example 9 | Aqueous Solution 9 | Ink 9 | (1-34) | PROXEL XL II | Betaine-1 |
| Example 10 | Aqueous Solution 10 | Ink 10 | (1-35) | PROXEL XL II | Betaine-1 |
| Example 11 | Aqueous Solution 11 | Ink 11 | (1-26) | PROXEL XL II | Betaine-1 |
| Example 12 | Aqueous Solution 12 | Ink 12 | (1-26) | PROXEL XL II | Betaine-1 |
| Example 13 | Aqueous Solution 13 | Ink 13 | (1-26) | PROXEL XL II | Betaine-1 |
| Example 14 | Aqueous Solution 14 | Ink 14 | (1-29) | PROXEL XL II | Betaine-1 |
| Example 15 | Aqueous Solution 15 | Ink 15 | (1-29) | PROXEL XL II | Betaine-1 |
| Example 16 | Aqueous Solution 16 | Ink 16 | (1-29) | PROXEL XL II | Betaine-1 |
| Example 17 | Aqueous Solution 17 | Ink 17 | (1-30) | PROXEL XL II | Betaine-1 |
| Example 18 | Aqueous Solution 18 | Ink 18 | (1-30) | PROXEL XL II | Betaine-1 |
| Example 19 | Aqueous Solution 19 | Ink 19 | (1-30) | PROXEL XL II | Betaine-1 |
| Example 20 | Aqueous Solution 20 | Ink 20 | (1-34) | PROXEL XL II | Betaine-1 |
| Example 21 | Aqueous Solution 21 | Ink 21 | (1-34) | PROXEL XL II | Betaine-1 |
| Example 22 | Aqueous Solution 22 | Ink 22 | (1-34) | PROXEL XL II | Betaine-1 |
| Example 23 | Aqueous Solution 23 | Ink 23 | (1-26) | PROXEL GXL | Betaine-1 |
| Example 24 | Aqueous Solution 24 | Ink 24 | (1-29) | PROXEL GXL | Betaine-1 |
| Example 25 | Aqueous Solution 25 | Ink 25 | (1-30) | PROXEL GXL | Betaine-1 |
| Example 26 | Aqueous Solution 26 | Ink 26 | (1-34) | PROXEL GXL | Betaine-1 |

TABLE 2

|  | Aqueous Solution | Ink Jet Recording Ink | Dye | Preservative | Betaine Compound |
|---|---|---|---|---|---|
| Example 27 | Aqueous Solution 27 | Ink 27 | (1-26) | PROXEL XL II/GXL | Betaine-1 |
| Example 28 | Aqueous Solution 28 | Ink 28 | (1-29) | PROXEL XL II/GXL | Betaine-1 |
| Example 29 | Aqueous Solution 29 | Ink 29 | (1-30) | PROXEL XL II/GXL | Betaine-1 |
| Example 30 | Aqueous Solution 30 | Ink 30 | (1-34) | PROXEL XL II/GXL | Betaine-1 |
| Example 31 | Aqueous Solution 31 | Ink 31 | (1-26) | Phenoxy Ethanol | Betaine-1 |
| Example 32 | Aqueous Solution 32 | Ink 32 | (1-30) | Phenoxy Ethanol | Betaine-1 |
| Example 33 | Aqueous Solution 33 | Ink 33 | (1-26) | Pentylene Glycol | Betaine-1 |
| Example 34 | Aqueous Solution 34 | Ink 34 | (1-30) | Pentylene Glycol | Betaine-1 |
| Example 35 | Aqueous Solution 35 | Ink 35 | (1-26) | Phenoxy Ethanol/ Pentylene Glycol | Betaine-1 |
| Example 36 | Aqueous Solution 36 | Ink 36 | (1-11) | PROXEL XL II | Betaine-2 |
| Example 37 | Aqueous Solution 37 | Ink 37 | (1-26) | PROXEL XL II | Betaine-2 |
| Example 38 | Aqueous Solution 38 | Ink 38 | (1-29) | PROXEL XL II | Betaine-2 |
| Example 39 | Aqueous Solution 39 | Ink 39 | (1-30) | PROXEL XL II | Betaine-2 |
| Example 40 | Aqueous Solution 40 | Ink 40 | (1-34) | PROXEL XL II | Betaine-2 |
| Comparative Example 1 | Comparative Aqueous Solution 1 | Comparative Ink 1 | (1-11) | Not Added | Betaine-1 |
| Comparative Example 2 | Comparative Aqueous Solution 2 | Comparative Ink 2 | (1-26) | Not Added | Betaine-1 |
| Comparative Example 3 | Comparative Aqueous Solution 3 | Comparative Ink 3 | (1-29) | Not Added | Betaine-1 |
| Comparative Example 4 | Comparative Aqueous Solution 4 | Comparative Ink 4 | (1-30) | Not Added | Betaine-1 |
| Comparative Example 5 | Comparative Aqueous Solution 5 | Comparative Ink 5 | (1-34) | Not Added | Betaine-1 |
| Comparative Example 6 | Comparative Aqueous Solution 6 | Comparative Ink 6 | Comparative Compound 1 | PROXEL XL II | Betaine-1 |
| Comparative Example 7 | Comparative Aqueous Solution 7 | Comparative Ink 7 | Comparative Compound 2 | PROXEL XL II | Betaine-1 |
| Comparative Example 8 | Comparative Aqueous Solution 8 | Comparative Ink 8 | Comparative Compound 3 | PROXEL XL II | Betaine-1 |
| Comparative Example 9 | Comparative Aqueous Solution 9 | Comparative Ink 9 | Comparative Compound 4 | PROXEL XL II | Betaine-1 |
| Comparative Example 10 | Comparative Aqueous Solution 10 | Comparative Ink 10 | Comparative Compound 5 | PROXEL XL II | Betaine-1 |

(Storage Stability of Aqueous Solution and Comparative Aqueous Solution)

Regarding the aqueous solutions 1 to 40 prepared in Examples 1 to 40 and the comparative aqueous solutions 1 to 10 prepared in Comparative Examples 1 to 10, a test for an aqueous solution storage stability was performed at 60° C. for 14 days, and the evaluation was performed based on the following determination criteria.

The evaluation was performed in two steps by visual inspection and 0.2 μm filtering, in which A represents an aqueous solution where the dissolved state was maintained, and B represents an aqueous solution where precipitation or separation of the dye occurred.

The results are shown in Tables 3 and 4 below.

(Antiseptic Properties)

A cap of Food Stamp (for viable count and for fungi; manufactured by Nissui Pharmaceutical Co., Ltd.) for inspecting bacteria was taken off, and a sufficient amount of each of the aqueous solutions 1 to 40 and the comparative aqueous solutions 1 to 10 was applied to a surface of agar.

By leaving the aqueous solution to stand for 10 hours in a state where the cap was not put, fungus attachment was accelerated. Next, the cap was put, the aqueous solution was incubated in a constant-temperature tank at 36° C. for 2 days for Food Stamp for viable count, and the aqueous solution was incubated in a constant-temperature tank at 23° C. for 5 days for Food Stamp for fungi. By visual inspection, the evaluation was performed based on the following criteria.

A: molds were not generated
B: molds were generated

The results are shown in Tables 3 and 4 below.

In addition, in a case where the antiseptic properties were evaluated as described above regarding each of the ink jet recording inks 1 to 40 and the comparative ink jet recording inks 1 to 10, the same results as those of the aqueous solutions 1 to 40 and the comparative aqueous solutions 1 to 10 were obtained, respectively.

TABLE 3

| | Aqueous Solution | Ink Jet Recording Ink | Antiseptic Properties | Storage Stability |
|---|---|---|---|---|
| Example 1 | Aqueous Solution 1 | Ink 1 | A | A |
| Example 2 | Aqueous Solution 2 | Ink 2 | A | A |
| Example 3 | Aqueous Solution 3 | Ink 3 | A | A |
| Example 4 | Aqueous Solution 4 | Ink 4 | A | A |
| Example 5 | Aqueous Solution 5 | Ink 5 | A | A |
| Example 6 | Aqueous Solution 6 | Ink 6 | A | A |
| Example 7 | Aqueous Solution 7 | Ink 7 | A | A |
| Example 8 | Aqueous Solution 8 | Ink 8 | A | A |
| Example 9 | Aqueous Solution 9 | Ink 9 | A | A |
| Example 10 | Aqueous Solution 10 | Ink 10 | A | A |
| Example 11 | Aqueous Solution 11 | Ink 11 | A | A |
| Example 12 | Aqueous Solution 12 | Ink 12 | A | A |
| Example 13 | Aqueous Solution 13 | Ink 13 | A | A |
| Example 14 | Aqueous Solution 14 | Ink 14 | A | A |
| Example 15 | Aqueous Solution 15 | Ink 15 | A | A |
| Example 16 | Aqueous Solution 16 | Ink 16 | A | A |
| Example 17 | Aqueous Solution 17 | Ink 17 | A | A |
| Example 18 | Aqueous Solution 18 | Ink 18 | A | A |
| Example 19 | Aqueous Solution 19 | Ink 19 | A | A |
| Example 20 | Aqueous Solution 20 | Ink 20 | A | A |
| Example 21 | Aqueous Solution 21 | Ink 21 | A | A |
| Example 22 | Aqueous Solution 22 | Ink 22 | A | A |
| Example 23 | Aqueous Solution 23 | Ink 23 | A | A |
| Example 24 | Aqueous Solution 24 | Ink 24 | A | A |
| Example 25 | Aqueous Solution 25 | Ink 25 | A | A |
| Example 26 | Aqueous Solution 26 | Ink 26 | A | A |

TABLE 4

| | Aqueous Solution | Ink Jet Recording Ink | Antiseptic Properties | Storage Stability |
|---|---|---|---|---|
| Example 27 | Aqueous Solution 27 | Ink 27 | A | A |
| Example 28 | Aqueous Solution 28 | Ink 28 | A | A |
| Example 29 | Aqueous Solution 29 | Ink 29 | A | A |
| Example 30 | Aqueous Solution 30 | Ink 30 | A | A |
| Example 31 | Aqueous Solution 31 | Ink 31 | A | A |
| Example 32 | Aqueous Solution 32 | Ink 32 | A | A |
| Example 33 | Aqueous Solution 33 | Ink 33 | A | A |
| Example 34 | Aqueous Solution 34 | Ink 34 | A | A |
| Example 35 | Aqueous Solution 35 | Ink 35 | A | A |
| Example 36 | Aqueous Solution 36 | Ink 36 | A | A |
| Example 37 | Aqueous Solution 37 | Ink 37 | A | A |
| Example 38 | Aqueous Solution 38 | Ink 38 | A | A |
| Example 39 | Aqueous Solution 39 | Ink 39 | A | A |
| Example 40 | Aqueous Solution 40 | Ink 40 | A | A |
| Comparative Example 1 | Comparative Aqueous Solution 1 | Comparative Ink 1 | B | B |
| Comparative Example 2 | Comparative Aqueous Solution 2 | Comparative Ink 2 | B | B |
| Comparative Example 3 | Comparative Aqueous Solution 3 | Comparative Ink 3 | B | B |
| Comparative Example 4 | Comparative Aqueous Solution 4 | Comparative Ink 4 | B | B |
| Comparative Example 5 | Comparative Aqueous Solution 5 | Comparative Ink 5 | B | B |
| Comparative Example 6 | Comparative Aqueous Solution 6 | Comparative Ink 6 | A | A |
| Comparative Example 7 | Comparative Aqueous Solution 7 | Comparative Ink 7 | A | A |
| Comparative Example 8 | Comparative Aqueous Solution 8 | Comparative Ink 8 | A | A |
| Comparative Example 9 | Comparative Aqueous Solution 9 | Comparative Ink 9 | A | A |
| Comparative Example 10 | Comparative Aqueous Solution 10 | Comparative Ink 10 | A | A |

(Image Recording and Evaluation)

The ink jet recording inks 1 to 40 according to Examples 1 to 40 and the comparative ink jet recording inks 1 to 10 according to Comparative Examples were evaluated as follows.

The respective evaluations were performed after filling an ink cartridge with each of the ink jet recording inks and recording an image on photographic paper ("GLOSSY", manufactured by Seiko Epson Corporation) using an ink jet printer (PM-700C, manufactured by Seiko Epson Corporation)

<Color>

In a case where the color of a printed sample was determined by visual inspection, the evaluation was performed in three steps. A sample having a color of pure magenta was evaluated as "A", a sample having a color of reddish magenta was evaluated as "B", and a sample having a color of reddish violet was evaluated as "C".

<Chroma>

The chroma (C*) of a printed material was calculated according to the following expression based on measurement of color characteristics. Using a reflection densitometer (trade name: X-Rite 310TR, manufactured by X-Rite Inc.), the lightness L* and the chromaticity a* and b* of a printed image portion at an applied voltage of 50% were measured according to the CIE L*a*b* color system (International Commission on Illumination (1976)/or JIS Z8781-4:2013). The chroma (C*) was obtained from the obtained values according to the following calculation expression and was evaluated based on the following determination criteria.

$$\text{Chroma } (C^*) = (a^{*2} + b^{*2})^{1/2}$$

A: C* was 90 or higher
B: C* was 80 or higher and lower than 90
C: C* was lower than 80

<Printing Density>

Using an ink jet printer (trade name: PM-700C, manufactured by Seiko Epson Corporation) and the ink jet recording ink described above, a monochromic image pattern in which an optical density (OD) value of magenta changed stepwise in a range of 0.1 to 2.0 was printed on an ink jet recording medium (photographic paper <GLOSSY> (trade name, manufactured by Seiko Epson Corporation)).

The reflectance density on the photographic paper where the printing density was maximum (ODmax) was measured as an image density using a reflection densitometer (X-Rite 310 TR) and the printing density was evaluated in three steps. A pattern having a printing density of 2.0 or higher was evaluated as "A", a pattern having a printing density of 1.8 or higher and lower than 2.0 was evaluated as "B", and a pattern having a printing density of lower than 1.8 was evaluated as "C".

<Light Fastness>

Immediately after the formation of the solid image, an image density Ci was measured. Next, the image was irradiated with xenon light (100000 lux) for 28 days using a weather meter (ATLAS C.165), and then an image density Cf1 was measured again. Based on the image density values before and after the irradiation of the xenon light, a colorant residue rate was calculated and evaluated. The image density was measured using a reflection densitometer (trade name: X-Rite 310TR, manufactured by X-rite Inc.). The colorant residue rate was measured in an image portion where the initial image density was 1.0±0.2.

The colorant residue rate was obtained according to the following expression and was evaluated based on the following determination criteria.

Colorant Residue Rate (%)=($Cf1/Ci$)×100

A: the colorant residue rate was 90% or higher
B: the colorant residue rate was 80% or higher and lower than 90%
C: the colorant residue rate was lower than 80%

<Ozone Fastness>

A 5 kV alternating current voltage was applied while causing dry air to flow through the inside of a double glass tube of an ozonizer (manufactured by Siemens AG). The photo glossy paper on which the image was formed was left to stand for 3 days in a box having an ozone gas concentration of 5±0.1 ppm that was set in a dark place at room temperature using the ozonizer. Next, the image density was measured using a reflection densitometer (trade name: X-Rite 310TR, manufactured by X-rite Inc.) before and after leaving the photo glossy paper to stand in ozone gas. Based on an initial image density Ci and an image density Cf2 measured after leaving the photo glossy paper to stand in ozone gas, a colorant residue rate was calculated and evaluated. The colorant residue rate was measured in an image portion where the initial image density was 1.0±0.2. The ozone gas concentration in the box was set using an ozone gas monitor (Mode: OZG-EM-01, manufactured by Applics Corporation).

The colorant residue rate was obtained according to the following expression and was evaluated based on the following determination criteria.

Colorant Residue Rate (%)=($Cf2/Ci$)×100

A: the colorant residue rate was 85% or higher
B: the colorant residue rate was 80% or higher and lower than 85%
C: the colorant residue rate was lower than 80%

<Moisture Resistance>

Regarding image blurring under high-humidity conditions, a 3 cm×3 cm printing pattern was prepared by disposing 1 mm×1 mm magenta squares such that 0.5 mm white spaces were formed between the squares. After storing this image sample under conditions of 45° C. and a relative humidity of 80% for 7 days, the blurring of the magenta dye was observed in the white spaces.

Specifically, the OD values of the printed material before and after the exposure to the high-humidity conditions were measured using a reflection densitometer "Spectrilino" (trade name, manufactured by Gretag Macbeth GmbH), and an increase in the magenta density of the white space immediately after the printing was measured in a green filter of Status A. A case where the measured value was lower than 0.02 was evaluated as A, a case where the measured value was 0.02 or higher and lower than 0.05 was evaluated as B, a case where the measured value was 0.05 or higher and lower than 0.10 was evaluated as C, and a case where the measured value was 0.10 or higher was evaluated as D.

<Jetting Stability>

Regarding jetting stability, an ink cartridge for an ink jet recording apparatus (trade name: PM-700C, manufactured by Seiko Epson Corporation) was filled with each of the inks obtained as described above, this cartridge was set on the ink jet recording apparatus, the jetting of the ink from all the nozzles was checked, and an image was printed on each of 100 sheets of A4 paper. The evaluation was performed based on the following criteria.

A: Substantially no irregularities of characters was found from the start to the end of printing
B: irregularities of characters were found on a large number of sheets of the photo glossy paper
C: irregularities of characters were found from the start to the end of printing This experiment was performed after storing the ink cartridge at 40° C. and a relative humidity of 80% for 2 weeks.

<Storage Stability of Ink Jet Recording Ink: Ink Jetting Stability and Printing Quality and Performance after Aqueous Solution Long-Term Storage Mandatory Test>

The aqueous solutions 1 to 40 according to Examples 1 to 40 and the comparative aqueous solutions 1 to 10 according to Comparative Examples 1 to 10 were stored at 60° C. for 14 days (also referred to as "mandatory storage test"). Next, an ink jet recording ink was prepared using each of the aqueous solutions, and the experiment was performed again. The evaluation was performed in two steps. A case where the quality and performance of the ink jet recording ink prepared using the aqueous solution before being provided for the mandatory storage test (immediately after the preparation) were maintained was evaluated as A, and a case where the quality and performance deteriorated in any one of required test items (color, chroma, printing density, light fastness, ozone fastness, moisture resistance, and jetting stability) in Tables 5 and 6 was evaluated B. The results are shown in Tables 5 and 6.

TABLE 5

|  | Color | Chroma | Printing Density | Light Fastness | Ozone Fastness | Moisture Resistance | Jetting Stability | Storage Stability |
|---|---|---|---|---|---|---|---|---|
| Example 1 | A | A | A | A | A | A | A | A |
| Example 2 | A | A | A | A | A | A | A | A |
| Example 3 | A | A | A | A | A | A | A | A |
| Example 4 | A | A | A | A | A | A | A | A |
| Example 5 | A | A | A | A | A | A | A | A |
| Example 6 | A | A | A | A | A | A | A | A |

TABLE 5-continued

|  | Color | Chroma | Printing Density | Light Fastness | Ozone Fastness | Moisture Resistance | Jetting Stability | Storage Stability |
|---|---|---|---|---|---|---|---|---|
| Example 7 | A | A | A | A | A | A | A | A |
| Example 8 | A | A | A | A | A | A | A | A |
| Example 9 | A | A | A | A | A | A | A | A |
| Example 10 | A | A | A | A | A | A | A | A |
| Example 11 | A | A | A | A | A | A | A | A |
| Example 12 | A | A | A | A | A | A | A | A |
| Example 13 | A | A | A | A | A | A | A | A |
| Example 14 | A | A | A | A | A | A | A | A |
| Example 15 | A | A | A | A | A | A | A | A |
| Example 16 | A | A | A | A | A | A | A | A |
| Example 17 | A | A | A | A | A | A | A | A |
| Example 18 | A | A | A | A | A | A | A | A |
| Example 19 | A | A | A | A | A | A | A | A |
| Example 20 | A | A | A | A | A | A | A | A |
| Example 21 | A | A | A | A | A | A | A | A |
| Example 22 | A | A | A | A | A | A | A | A |
| Example 23 | A | A | A | A | A | A | A | A |
| Example 24 | A | A | A | A | A | A | A | A |
| Example 25 | A | A | A | A | A | A | A | A |
| Example 26 | A | A | A | A | A | A | A | A |

TABLE 6

|  | Color | Chroma | Printing Density | Light Fastness | Ozone Fastness | Moisture Resistance | Jetting Stability | Storage Stability |
|---|---|---|---|---|---|---|---|---|
| Example 27 | A | A | A | A | A | A | A | A |
| Example 28 | A | A | A | A | A | A | A | A |
| Example 29 | A | A | A | A | A | A | A | A |
| Example 30 | A | A | A | A | A | A | A | A |
| Example 31 | A | A | A | A | A | A | A | A |
| Example 32 | A | A | A | A | A | A | A | A |
| Example 33 | A | A | A | A | A | A | A | A |
| Example 34 | A | A | A | A | A | A | A | A |
| Example 35 | A | A | A | A | A | A | A | A |
| Example 36 | A | A | A | A | A | A | A | A |
| Example 37 | A | A | A | A | A | A | A | A |
| Example 38 | A | A | A | A | A | A | A | A |
| Example 39 | A | A | A | A | A | A | A | A |
| Example 40 | A | A | A | A | A | A | A | A |
| Comparative Example 1 | A | A | A | A | A | A | B | B |
| Comparative Example 2 | A | A | A | A | A | A | B | B |
| Comparative Example 3 | A | A | A | A | A | A | B | B |
| Comparative Example 4 | A | A | A | A | A | A | B | B |
| Comparative Example 5 | A | A | A | A | A | A | B | B |
| Comparative Example 6 | B | B | A | C | C | D | A | A |
| Comparative Example 7 | A | A | A | C | B | D | A | A |
| Comparative Example 8 | A | A | A | A | B | C | A | A |

TABLE 6-continued

|  | Color | Chroma | Printing Density | Light Fastness | Ozone Fastness | Moisture Resistance | Jetting Stability | Storage Stability |
|---|---|---|---|---|---|---|---|---|
| Comparative Example 9 | C | B | C | B | B | B | A | A |
| Comparative Example 10 | B | C | B | A | B | C | A | A |

As can be seen from the results, in the aqueous solution and the ink jet recording ink according to the embodiment of the present invention, the storage stability during a long-term storage, and the printing quality and jetting stability of an aqueous ink that is prepared using the aqueous dye solution after a long-term storage are excellent.

According to the present invention, it is possible to provide: an aqueous solution that is an aqueous dye solution with which an aqueous ink having excellent printing quality can be provided, excellent storage stability during a long-term storage can be exhibited, and an aqueous ink having excellent printing quality and jetting stability can be provided even in a case where the aqueous ink is prepared using the aqueous dye solution after a long-term storage; a coloring composition that is formed of the aqueous solution; an ink jet recording ink; an ink jet recording method; and an ink cartridge.

The present invention has been described in detail with reference to the specific embodiment. However, it is obvious to those skilled in the art that various modifications and changes can be made within a range not departing from the scope of the present invention.

What is claimed is:

1. An aqueous solution comprising:
a compound represented by the following Formula (1);
a preservative which is at least one selected from the group consisting of a heterocyclic compound, a phenol derivative, a phenoxy ether derivative, and an alkanediol; and
a betaine compound represented by the following Formula (W-2),
wherein the content of the compound represented by the Formula (1) is 5 to 25 mass % with respect to the total mass of the aqueous solution, Formula (1)

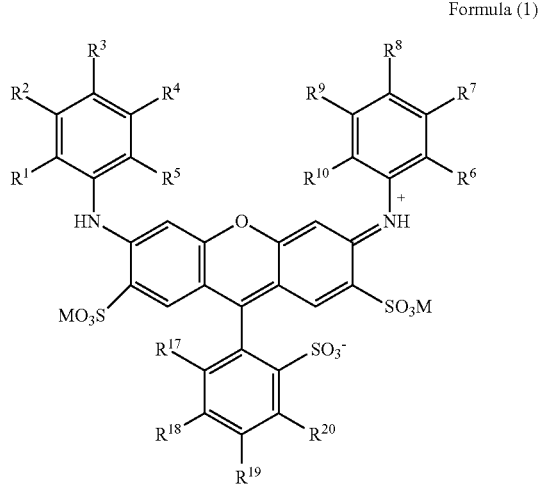

wherein, in the Formula (1), $R^1$, $R^5$, $R^6$, and $R^{10}$ each independently represent an alkyl group, $R^4$, $R^9$, $R^{17}$, $R^{18}$, $R^{19}$, and $R^{20}$ each independently represent a hydrogen atom or a substituent, $R^2$, $R^3$, $R^7$, and $R^8$ each independently represent a hydrogen atom, an alkyl group, or a substituent represented by the following Formula (A), at least one of $R^2$, $R^3$, $R^7$, or $R^8$ represents a substituent represented by the following Formula (A), and M represents a hydrogen atom or a monovalent counter cation, Formula (A)

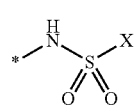

wherein, in the Formula (A), X represents a substituent represented by the following Formula (X1), (X2), or (X3), and represents a bond to a benzene ring, Formula (X1)

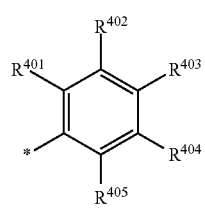

wherein, in the Formula (X1), $R^{401}$, $R^{402}$, $R^{403}$, $R^{404}$ and $R^{405}$ each independently represent a hydrogen atom or a substituent, $R^{401}$, $R^{402}$, $R^{403}$, $R^{404}$, and $R^{405}$ satisfy the following condition (i) or (ii), represents a bond to a sulfur atom, the condition (i): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group, and the condition (ii): at least two of $R^{401}$, $R^{402}$, $R^{403}$, $R^{404}$, or $R^{405}$ represent a carboxyl group, Formula (X2)

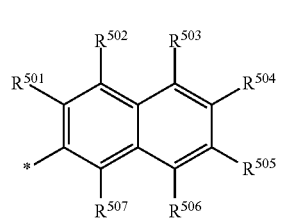

wherein, in the Formula (X2), $R^{501}$, $R^{502}$, $R^{503}$, $R^{504}$, $R^{505}$, $R^{506}$, and $R^{507}$ each independently represent a hydrogen atom or a substituent, $R^{501}$, $R^{502}$, $R^{503}$, $R^{504}$, $R^{505}$, $R^{506}$, and $R^{507}$ satisfy the following condition (iii) or (iv), represents a bond to a sulfur atom,
the condition (iii): at least one of $R^{501}$, $R^{502}$, $R^{503}$, $R^{504}$, $R^{505}$, $R^{506}$, or $R^{507}$ represents a hydroxyl group and at least one of $R^{501}$, $R^{502}$, $R^{503}$, $R^{504}$, $R^{505}$, $R^{506}$, or $R^{507}$ represents a carboxyl group, and
the condition (iv): at least two of $R^{501}$, $R^{502}$, $R^{503}$, $R^{504}$, $R^{505}$, $R^{506}$, or $R^{507}$ represent a carboxyl group, and

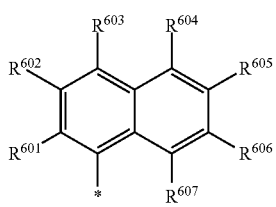

Formula (X3)

wherein, in the Formula (X3), $R^{601}$, $R^{602}$, $R^{603}$, $R^{604}$, $R^{605}$, $R^{606}$, and $R^{607}$ each independently represent a hydrogen atom or a substituent,
$R^{601}$, $R^{602}$, $R^{603}$, $R^{604}$, $R^{605}$, $R^{606}$, and $R^{607}$ satisfy the following condition (v) or (vi),
represents a bond to a sulfur atom,
the condition (v): at least one of $R^{601}$, $R^{602}$, $R^{603}$, $R^{604}$, $R^{605}$, $R^{606}$, or $R^{607}$ represents a hydroxyl group and at least one of $R^{601}$, $R^{602}$, $R^{603}$, $R^{604}$, $R^{605}$, $R^{606}$, or $R^{607}$ represents a carboxyl group, and
the condition (vi): at least two of $R^{601}$, $R^{602}$, $R^{603}$, $R^{604}$, $R^{605}$, $R^{606}$, or $R^{607}$ represent a carboxyl group, and

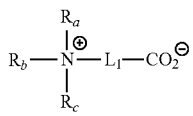

Formula (W-2)

wherein, in the Formula (W-2), Ra, Rb, and Rc each independently represent a hydrogen atom, an alkyl group, an aryl group, or a heterocyclic group,
at least one of Ra, Rb or Rc has an alkyl group having 8 or more carbon atoms, and
$L_1$ represents a divalent linking group.

2. The aqueous solution according to claim 1,
wherein the compound represented by the Formula (1) is a compound represented by the following Formula (2),

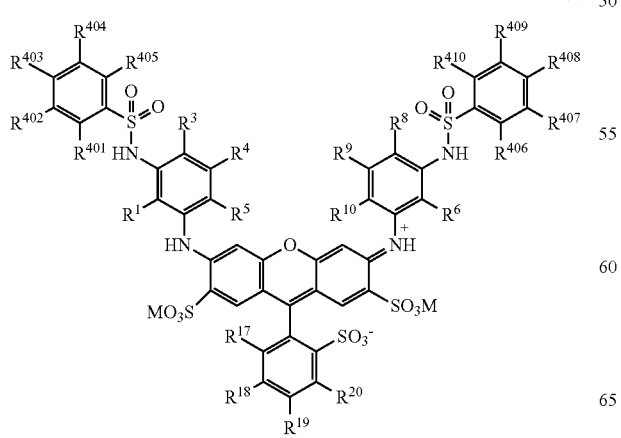

Formula (2)

wherein, in the Formula (2), $R^1$, $R^5$, $R^6$, and $R^{10}$ each independently represent an alkyl group,
$R^4$, $R^9$, $R^{17}$, $R^{18}$, $R^{19}$, and $R^{20}$ each independently represent a hydrogen atom or a substituent,
$R^3$ and $R^8$ each independently represent a hydrogen atom or an alkyl group,
$R^{401}$, $R^{402}$, $R^{403}$, $R^{404}$, and $R^{405}$ each independently represent a hydrogen atom or a substituent,
$R^{401}$, $R^{402}$, $R^{403}$, $R^{404}$, and $R^{405}$ satisfy the following condition (i-1) or (ii-1),
$R^{406}$, $R^{407}$, $R^{408}$, $R^{409}$, and $R^{410}$ each independently represent a hydrogen atom or a substituent,
$R^{406}$, $R^{407}$, $R^{408}$, $R^{409}$, and $R^{410}$ satisfy the following condition (i-2) or (ii-2),
M represents a hydrogen atom or a monovalent counter cation,
the condition (i-1): at least one of $R^{401}$, $R^{402}$, $R^{403}$, $R^{404}$, or $R^{405}$ represents a hydroxyl group and at least one of $R^{401}$, $R^{402}$, $R^{403}$, $R^{404}$, or $R^{405}$ represents a carboxyl group,
the condition (ii-1): at least two of $R^{401}$, $R^{402}$, $R^{403}$, $R^{404}$, or $R^{405}$ represent a carboxyl group,
the condition (i-2): at least one of $R^{406}$, $R^{407}$, $R^{408}$, $R^{409}$, or $R^{410}$ represents a hydroxyl group and at least one of $R^{406}$, $R^{407}$, $R^{408}$, $R^{409}$, or $R^{410}$ represents a carboxyl group, and
the condition (ii-2): at least two of $R^{406}$, $R^{407}$, $R^{408}$, $R^{409}$, or $R^{410}$ represent a carboxyl group.

3. The aqueous solution according to claim 2,
wherein $R^{401}$, $R^{402}$, $R^{403}$, $R^{404}$, and $R^{405}$ in the Formula (2) satisfy the condition (ii-1), and
$R^{406}$, $R^{407}$, $R^{408}$, $R^{409}$, and $R^{410}$ in the Formula (2) satisfy the condition (ii-2).

4. The aqueous solution according to claim 1,
wherein the compound represented by the Formula (1) is a compound represented by the following Formula (2'),

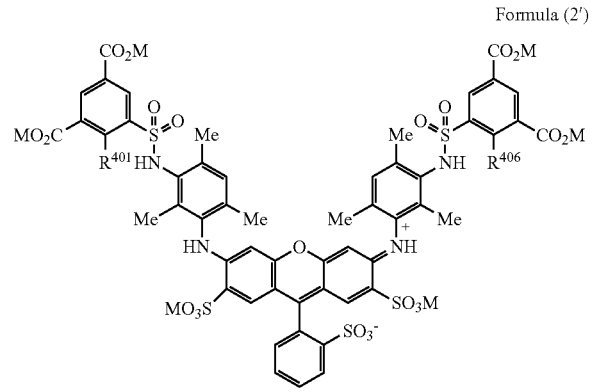

Formula (2')

wherein, in the Formula (2'), $R^{401}$ and $R^{406}$ each independently represent a hydrogen atom, a halogen atom, a hydroxyl group, or a methyl group, and
M represents a hydrogen atom, a lithium ion, a sodium ion, a potassium ion, or an ammonium ion.

5. The aqueous solution according to claim 4,
wherein $R^{401}$ and $R^{406}$ in the Formula (2') represent a hydroxyl group.

6. The aqueous solution according to claim 1,
wherein the preservative is the heterocyclic compound, and
the heterocyclic compound is a thiazole compound or a benzotriazole compound.

7. The aqueous solution according to claim 1, comprising: two or more kinds of the preservatives.

8. The aqueous solution according to claim 1, wherein the total content of the preservative is 0.01 to 0.5 mass % with respect to the total mass of the aqueous solution.

9. The aqueous solution according to claim 1, wherein the mass ratio of the compound represented by the Formula (1) to the preservative is 90/10 to 99/1.

10. The aqueous solution according to claim 1, wherein the content of the betaine compound is 1 to 10 mass % with respect to the total mass of the aqueous solution.

11. A coloring composition that is formed using the aqueous solution according to claim 1.

12. An ink jet recording ink that is formed using the aqueous solution according to claim 1.

13. An ink jet recording method comprising: forming a colored image on a recording material using the ink jet recording ink according to claim 12.

14. An ink cartridge for ink jet recording that is filled with the ink jet recording ink according to claim 12.

\* \* \* \* \*